United States Patent
Goldberg et al.

(10) Patent No.: US 10,631,475 B2
(45) Date of Patent: Apr. 28, 2020

(54) LOW COST PRECISION IRRIGATION SYSTEM WITH PASSIVE VALVES AND PORTABLE ADJUSTING DEVICE

(71) Applicant: The Regents of the University of California, Oakland, CA (US)

(72) Inventors: Ken Goldberg, Mill Valley, CA (US); Stefano Carpin, Santa Cruz, CA (US); Stephen McKinley, Berkeley, CA (US); Stavros Vougioukas, Davis, CA (US); David Gealy, Arroyo Grande, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/752,474

(22) PCT Filed: Aug. 11, 2016

(86) PCT No.: PCT/US2016/046580
§ 371 (c)(1),
(2) Date: Feb. 13, 2018

(87) PCT Pub. No.: WO2017/030903
PCT Pub. Date: Feb. 23, 2017

(65) Prior Publication Data
US 2019/0008103 A1    Jan. 10, 2019

Related U.S. Application Data

(60) Provisional application No. 62/205,595, filed on Aug. 14, 2015.

(51) Int. Cl.
*A01G 25/16* (2006.01)
*A01G 25/02* (2006.01)
(Continued)

(52) U.S. Cl.
CPC ............ *A01G 25/16* (2013.01); *A01G 25/02* (2013.01); *B25J 5/007* (2013.01); *B25J 11/00* (2013.01);
(Continued)

(58) Field of Classification Search
None
See application file for complete search history.

(56) References Cited

U.S. PATENT DOCUMENTS 8,677,862 B2    3/2014 Backlund
9,107,354 B2 *  8/2015 Martin ................ A01G 25/167
(Continued)

FOREIGN PATENT DOCUMENTS

JP    2004-016182 A    1/2004
JP    2005-160423 A    6/2005
(Continued)

OTHER PUBLICATIONS

Gealy et al., "Co-Robotic device for automated tuning of emitters to enable precision irrigation," 12th Conference on Automation Science and Engineering, IEEE Transactions on Automation Science and Engineering (IEEE Case 2016), pp. 1-7 (Aug. 2016). [Cited in an International Search Report and Written Opinion in International Patent Application No. PCT/US2016/046580, dated Nov. 10, 2016].
(Continued)

*Primary Examiner* — Jason Lin
(74) *Attorney, Agent, or Firm* — Venable LLP; Henry J. Daley; Larry G. Remus

(57) ABSTRACT

According to some embodiments of the invention, an adjusting device for adjusting a passive drip irrigation valve to enable precision irrigation includes a device body configured to be at least one of hand-held or attachable to a robot, the device body having a manipulator end, and a manipulator assembly contained within and extending from the
(Continued)

manipulator end of the device body. The manipulator assembly includes a coarse alignment adjustment assembly constructed and arranged to align the adjusting device with the passive drip irrigation valve. The manipulator assembly also includes a fine actuator configured to rotate the passive drip irrigation valve by a specified angle.

26 Claims, 22 Drawing Sheets

(51) Int. Cl.
    *B25J 5/00*         (2006.01)
    *B25J 11/00*       (2006.01)
    *G05D 1/02*        (2020.01)
    *F16K 47/04*       (2006.01)
    *G01C 21/00*      (2006.01)
    *G05B 19/10*      (2006.01)
    *G06K 7/10*       (2006.01)

(52) U.S. Cl.
    CPC ............ *F16K 47/045* (2013.01); *G01C 21/00* (2013.01); *G05B 19/106* (2013.01); *G05D 1/028* (2013.01); *G05D 1/0246* (2013.01); *G05D 1/0282* (2013.01); *G06K 7/10415* (2013.01); *G05B 2219/2625* (2013.01); *G05D 2201/0201* (2013.01); *Y02A 40/237* (2018.01)

(56) References Cited

U.S. PATENT DOCUMENTS

| | | | |
|---|---|---|---|
| 2006/0027677 A1* | 2/2006 | Abts | A01G 25/092 239/67 |
| 2006/0161309 A1* | 7/2006 | Moore | A01G 25/16 700/284 |
| 2009/0216594 A1* | 8/2009 | Verhey | G06Q 10/0637 705/7.36 |
| 2016/0088807 A1* | 3/2016 | Bermudez Rodriguez | A01G 25/092 700/284 |
| 2017/0120263 A1* | 5/2017 | Needham | B05B 1/3013 |

FOREIGN PATENT DOCUMENTS

| | | |
|---|---|---|
| JP | 2011-200196 A | 10/2011 |
| KR | 10-2012-0068776 A | 6/2012 |

OTHER PUBLICATIONS

International Search Report and Written Opinion in International Patent Application No. PCT/US2016/046580, dated Nov. 10, 2016.
Aleotti et al. "Perception and Grasping of Object Parts from Active Robot Exploration." Journal of Intelligent & Robotic Systems, vol. 76, pp. 401-525, 2014.
Arno et al. "Review. Precision Viticulture. Research topics, challenges and opportunities in site-specific vineyard management" Spanish Journal of Agricultural Research, vol. 7, No. 4, pp. 779-790, 2009.
Atanasov et al. "Hypothesis Testing Framework for Active Object Detection." Proceedings of the IEEE International Conference on Robotics and Automation (ICRA), 2013, pp. 4216-4222.
Auat Cheein et al. "Agricultural Robotics: Unmanned Robotic Service Units in Agricultural Tasks." IEEE Industrial Electronics Magazine, vol. 7, No. 3, pp. 48-58, 2013.
Bak et al. "Agricultural Robotic Platform with Four Wheel Steering for Weed Detection." Biosystems Engineering, vol. 87, No. 2, pp. 125-136, 2004.
Bellvert et al. "Mapping crop water stress index in a 'Pinot-noir' vineyard: comparing ground measurements with thermal remote sensing imagery from an unmanned aerial vehicle." Precision Agriculture, vol. 15, No. 4, pp. 361-376, 2014.
BIS Research "Global Precision Agriculture Market Analysis & Forecast (2015-2022) Technology (VRA, Soil Mapping, Yield Monitoring, Precision Irrigation, Others), Components and Systems." Research and Markets, 2014.
Bouet et al. "RFID tags: Positioning Principles and Localization Techniques." 2008 1st IFIP Wireless Days, IEEE, 2008.
Coates et al. "Wireless sensor network with irrigation valve control." Computers and Electronics in Agriculture, vol. 96, pp. 13-22, 2013.
Emmi et al. "New trends in Robotics for Agriculture: Integration and Assessment of a Real Fleet of Robots." The Scientific World Journal, vol. 2014, pp. 1-21 (22 pages total), 2014.
Gleick et al. "Water Use." Annual Review of Environment and Resources, vol. 28, No. 1, pp. 275-314 (42 pages total), 2003.
Gutiérrez et al. "Automated Irrigation System Using a Wireless Sensor Network and GPRS Module." IEEE Transactions on Instrumentation and Measurement, vol. 63, No. 1, pp. 166-176, 2014.
Hanson et al. "A comparison of furrow, surface drip, and subsurface drip irrigation on lettuce yield and applied water." Agricultural Water Management, vol. 33, pp. 139-157, 1997.
Hinterhofer et al. "Wireless QoS-enabled Multi-Technology Communication for the RHEA Robotic Fleet." RHEA-2011 Robotics and Associated High-Technologies and Equipment for Agriculture, pp. 173-186, 2011.
Holz et al. "Active Recognition and Manipulation for Mobile Robot Bin Picking." In: Gearing up and accelerating cross-fertilization between academic and industrial robotics research in Europe—Technology transfer experiments from the ECHORD project, Springer Tracts in Advanced Robotics (STAR), vol. 94, pp. 133-153, 2014.
Howitt et al. "Economic Analysis of the 2015 Drought for California Agriculture." Center for Watershed Sciences, University of California, Davis, 2015.
Johnson et al. "Development and Implementation of a Team of Robotic Tractors for Autonomous Peat Moss Harvesting." Journal of Field Robotics, vol. 26, No. 6-7, pp. 549-571, 2009.
Kandelous et al. "Comparison of numerical, analytical, and empirical models to estimate wetting patterns for surface and subsurface drip irrigation." Irrigation Science, vol. 28, No. 5, pp. 435-444, 2010.
Lopus et al. "Survey examines the adoption of perceived best management practices for almond nutrition." California Agriculture, vol. 64, No. 3, pp. 149-154, 2010.
Mahler et al. "Energy-Bounded Caging: Formal Definition and 2D Energy Lower Bound Algorithm Based on Weighted Alpha Shapes." IEEE Robotics and Automation Letters, vol. 1, No. 1, pp. 508-515, 2016.
Maisiri et al. "On farm evaluation of the effect of low cost drip irrigation on water and crop productivity compared to conventional surface irrigation system." Physics and Chemistry of the Earth, Parts A/B/C, vol. 30, pp. 783-791, 2005.
Majone et al. "Wireless Sensor Network deployment for monitoring soil moisture dynamics at the field scale." Procedia Environmental Sciences, vol. 19, pp. 426-435, 2013.
Navarro-Hellin et al. "A wireless sensors architecture for efficient irrigation water management," Agricultural Water Management, vol. 151, pp. 1-11, 2014.
Osakabe et al. "Response of plants to water stress." Front. Plant Sci, vol. 5, No. 86, pp. 1-8, 2014.
Provenzano "Using HYDRUS-2D Simulation Model to Evaluate Wetted Soil Volume in Subsurface Drip Irrigation Systems." Journal of Irrigation and Drainage Engineering, vol. 133, No. 4, pp. 342-349, 2007.
Rehman et al. "A review of wireless sensors and networks' applications in agriculture." Computer Standards & Interfaces, vol. 36, No. 2, pp. 263-270, 2014.
Robinson et al. "Soil Moisture Measurement for Ecological and Hydrological Watershed-Scale Observatories: A Review." Vadose Zone Journal, vol. 7, No. 1, pp. 358-389, 2008.
Rodriguez et al. "From Caging to Grasping." The International Journal of Robotics Research, vol. 31, No. 7, pp. 886-900, 2012.

(56) References Cited

OTHER PUBLICATIONS

Romano "Soil moisture at local scale: Measurements and simulations." Journal of Hydrology, vol. 516, pp. 6-20, 2014.

Saxena et al. "Robotic Grasping of Novel Objects using Vision." International Journal of Robotics Research, vol. 27, No. 2, pp. 157-173, 2008.

Shumake et al. "Repellents to Reduce Cable Gnawing by Northern Pocket Gophers." The Journal of Wildlife Management, vol. 63, No. 4, pp. 1344-1349, 1999.

Tian. "Development of a sensor-based precision herbicide application system." Computers and electronics in agriculture, vol. 36, No. 2, pp. 133-149, 2002.

Tilney et al. "AgTech Investing Report: Year in Review 2014." AgFunder, 2015.

Torabi et al. "An autonomous Six-DOF eye-in-hand system for in situ 3D object modeling." International Journal of Robotics Research, vol. 31, No. 1, pp. 82-100, 2012.

Vereecken et al. "On the spatio-temporal dynamics of soil moisture at the field scale." Journal of Hydrology, vol. 516, pp. 76-96, 2014.

Vougioukas "A distributed control framework for motion coordination of teams of autonomous agricultural vehicles." Biosystems Engineering, vol. 113, No. 3, pp. 284-297, 2012.

Vörösmarty et al. "Global Water Resources: Vulnerability from Climate Change and Population Growth." Science, vol. 289, No. 5477, pp. 284-288, 2000.

PC-Progress "Hydrus 2D/3D." URL: http://www.pc-progress.com/en/Default.aspx?hydrus3d, [Online; accessed: Feb. 2016].

CIMIS—California Irrigation Management Information System, "CIMIS Overview." pp. 1-3, URL: http://www.cimis.water.ca.gov/, [Online; accessed: Feb. 2016].

Vekshin. "California water prices soar for farmers as drought grows." Bloomberg: New York, NY, USA, 2014.

Ghazouani et al. "Assessing Hydrus-2D Model to Investigate the Effects of Different On-Farm Irrigation Strategies on Potato Crop under Subsurface Drip Irrigation." Water, vol. 11, No. 540, pp. 1-18, 2019.

\* cited by examiner

LOW COST PRECISION IRRIGATION SYSTEM WITH PASSIVE VALVES AND PORTABLE ADJUSTING DEVICE

This invention was made with U.S. Government support under grant number IIS-1227536 awarded by the National Science Foundation. The U.S. Government has certain rights in the invention.

This application is a U.S. National Stage Application under 35 U.S.C. § 371 of PCT/US2016/046580, filed on Aug, 11, 2016, the entire content of which is hereby incorporated by reference, and claims the benefit of U.S. Provisional Application No. 62/205,595, filed Aug. 14, 2015.

BACKGROUND

1. Technical Field

The field of the currently claimed embodiments of this invention relates to agricultural irrigation, and more particularly to systems for precision irrigation.

2. Motivation for Precision Irrigation

Agriculture accounts for a large percentage of water use worldwide. For example, in the state of California, agricultural accounts for up to 80% of water usage. With current and potential drought conditions, the market for precision agriculture, a farming resource management concept based on observing, measuring, and responding to inter and intra-field variability in crops and environmental conditions, is estimated to grow to a $6.3 billion industry by 2022 [1]. Precision agriculture startups attracted more investments in 2014 than any other AgTech sector [2].

Prolonged drought in California and the Southwest has induced unparalleled cuts in water allocation to farmers, and water prices have gone from $140 per acre-foot to $1100 per acre-foot [3]. There is unprecedented pressure to streamline water use and increase efficiency in agriculture, in particular for high value crops (almonds, grapes, and table grapes). Notwithstanding, in almond orchards, practices like flooding are regularly used to irrigate entire tree lines, sometimes just to relieve a handful of trees undergoing water stress. A complementary problem occurs in the grapes sector, where it is necessary to appropriately stress individual vines to boost the quality of the resulting grape.

Several studies have been made comparing sub-surface, surface, and furrow drip irrigation methods. Sub-surface drip irrigation is slightly more water efficient but less cost efficient than exposed furrow irrigation [17]. Furrow drip irrigation is a widely adopted irrigation technique which uses arrays of pipes to deliver water from a source to thousands of drip emitters in parallel mounted on irrigation lines 18 inches above the soil surface. Furrow drip irrigation is less prone to clogging and easier to maintain and adapt than surface or sub-surface drip irrigation.

Water outputs for all types of drip irrigation are actuated for blocks of hundreds of emitters at once. Accordingly, water cannot be distributed to a single plant or group of plants without distributing water to the entire block of emitters. This results in wasted water, in addition to over-watering of plants that were not in need of water. Accordingly, farmers are forced to choose between wasting water and possibly losing a portion of their crop due to insufficient irrigation.

Insufficient irrigation can adversely affect plant physiology and crop yield. If prolonged, this condition is known as water stress [28]. However, in the case of wine grapes (grown throughout California, including the Central Valley), it is desirable to selectively stress each vine to maintain a desired concentration of sugars and development of flavinoids. Precision viticulture is an emerging area with increasing impact in the wine-growing sector [8] and similar plant-level irrigation is desired for other high value crops such as almonds [23].

Technologies such as Unmanned Aerial Vehicles (UAVs) equipped with heterogeneous sensors can provide farmers with detailed maps of water use and ground conditions. Soil moisture probes can also be used to track local water properties in the field. However, closing the sensing-actuation loop to adjust irrigation at the plant level remains an unsolved challenge.

3. Discussion of Related Art

Automation systems are becoming an integral component in agricultural operations [10]. Distributed systems of Unmanned Ground Vehicles (UGVs) operating autonomously, for example fleets of autonomous tractors for harvesting [21] have been explored as solutions to labor shortages in agricultural settings [40]. Following the commercialization of computer vision sensors, global positioning systems, Light Detection and Ranging (LIDAR), and Inertial Measurement Units (IMUs), robotics research over the past two decades has led to many examples of unmanned robotic vehicles and service units in agriculture [14]. Demonstrated uses of UGVs in agriculture include weed detection [11] and precision herbicide deployment [35]. However, existing systems are not cost effective for precision agriculture.

SUMMARY

According to some embodiments of the invention, an adjusting device for adjusting a passive drip irrigation valve to enable precision irrigation includes a device body configured to be at least one of hand-held or attachable to a robot, the device body having a manipulator end, and a manipulator assembly contained within and extending from the manipulator end of the device body. The manipulator assembly includes a coarse alignment adjustment assembly constructed and arranged to align the adjusting device with the passive drip irrigation valve. The manipulator assembly also includes a fine actuator configured to rotate the passive drip irrigation valve by a specified angle.

According to some embodiments of the invention, a system for enabling precision irrigation includes an adjusting device for adjusting a passive drip irrigation valve. The adjusting device includes a device body configured to be at least one of hand-held or attachable to a robot, the device body having a manipulator end, and a manipulator assembly contained within and extending from the manipulator end of the device body. The system for enabling precision irrigation also includes a processor configured to process irrigation data and communicate with the adjusting device about desired changes to the passive drip irrigation valve based on the processed irrigation data. The manipulator assembly includes a coarse alignment adjustment assembly constructed and arranged to align the adjusting device with the passive drip irrigation valve, and the manipulator assembly also includes a fine actuator configured to rotate the passive drip irrigation valve by a specified angle.

According to some embodiments of the invention, a robotic system for precision irrigation includes a mobile robot including a robot arm, the robot arm including an actuator configured to connect to and manipulate a passive drip irrigation valve to be adjusted. The robotic system also includes a control system in communication with the mobile robot, and a navigation system in communication with the control system, the navigation system having an accuracy sufficient to guide the mobile robot to a particular passive drip irrigation valve. The control system is configured to identify a location of the passive drip irrigation valve based on information received from the navigation system, and instruct the mobile robot to connect to and manipulate the passive drip irrigation valve to adjust a rate of fluid flow through the passive drip irrigation valve.

BRIEF DESCRIPTION OF THE DRAWINGS

Further objectives and advantages will become apparent from a consideration of the description, drawings, and examples.

DETAILED DESCRIPTION

Figure 1:
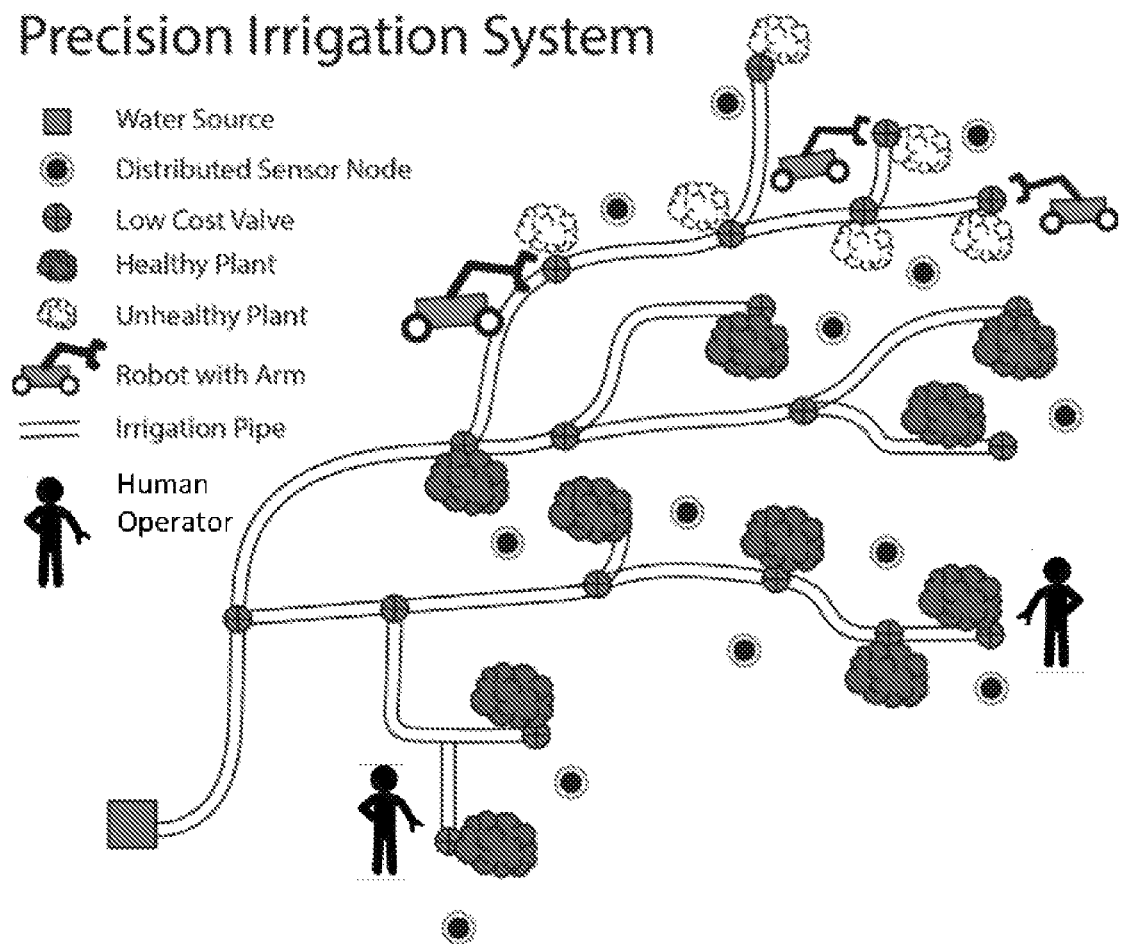
FIG. 1 is a schematic representation of a precision irrigation system with passive emitters and mobile robots according to some embodiments of the invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Embodiments of the current invention provide a precision irrigation system for delivering a precise amount of water to a plant or group of plants that is tailored to the specific needs of the plants. The system enables the distribution of a large number of passive valves throughout an agricultural area, each valve distributing water to a small region. These valves can be adjusted by an actuator in communication with a control system that determines precisely how the valves should be adjusted to deliver the necessary amount of water to the plants.

The distribution of emitters through an orchard, vineyard, or field potentially allows a farmer to adjust the water distributed to areas based on the specific needs of the plant or plants in the area. However, a key consideration is how the large quantity of emitters can be adjusted. In most agricultural systems, a single valve is adjusted to increase or reduce the amount of water distributed to a large area. When the number of valves is multiplied by hundreds or thousands, the conventional adjustment mechanisms may not be feasible.

One method of addressing this challenge is to use actuated emitters. For example, each plant in an orchard may have an actuated emitter that communicates wirelessly with a control system, and that can be remotely actuated to adjust an amount of water flowing through the emitter. However, installing thousands of actuated emitters in the field poses economic challenges as well as technical ones. A detailed economic analysis of a 10-node wireless sensor and actuator system for precision irrigation can be found in [13]. Such a system has a risk of degradation due to environmental conditions and pests such as the Northern Pocket Gopher (*Geomys bursarius*) [34]. Further, costs associated with individually actuated irrigation nodes scale prohibitively over large-scale farming operations. For example, a single individually actuated valve can cost about $14, and a controller for controlling just six individually actuated valves can cost more than $150. These costs are clearly prohibitive in view of the thousands of valves and controllers that would be required to achieve precision irrigation of a large agricultural area. Accordingly, a more robust and inexpensive system is required.

The embodiments of the present invention include an adjusting device that interacts with a plurality of passive emitters. The fact that the emitters are passive has the combined advantage of making them less susceptible to environmental damage, and allowing them to be manufactured and deployed at low cost. The passive valves can be designed to withstand harsh conditions such as moisture, chemicals, tractors, high and low temperatures, wind, dust, insects, rodents, and the like. The cost of passive valves is approximately $0.25, significantly less than the cost of an individually actuated valve. However, because the valves are passive, the precision irrigation system requires physical actuation of the valves by an actuator. Embodiments of the invention provide an actuator for interacting with the passive valves, enabling the precise adjustment of a larger number of valves distributed over an expansive agricultural area.

The term "valve" is used herein to mean a device for regulating a flow of fluid. The valve may be attached to an irrigation line, and may allow water from the irrigation line to flow through the valve to be distributed to a plant or group of plants. The valve may also have a mechanism for adjusting the rate at which fluid flows through the valve. For example, the valve may be a screw with varying diameter. The terms "valve" and "emitter" are used interchangeably herein. The term "passive" in reference to a valve is intended to mean that the valve is not self-actuating or self-adjusting, but requires physical actuation by a third party in order to be adjusted.

FIG. 1 is a schematic representation of a precision irrigation system with passive emitters and adjusting devices according to some embodiments of the invention. The use of the adjusting devices can significantly increase precision of new and existing drip irrigation systems and reduce water consumption. The sensors can be static hydration sensors distributed throughout the agricultural field, or sensors such as visual and infra-red cameras carried by aircraft, balloons, aerial drones, satellites, or a variety of other means, as described in more detail below. Mobile agents (human workers and/or mobile robots, for example) move through the field in a continuous or periodic basis and are each depicted carrying an adjusting device that interacts with passive water valves in a drip irrigation system. The valves are shown as dots near each plant that can be adjusted to deliver the precise amount of water required by each plant without excess. As the number of valves and emitters greatly exceeds the number of agents, valves may be visited and adjusted on a greater time scale, anywhere from a few days to weeks. FIG. 1 illustrates several agents interacting with and adjusting valves.

Figure 2:
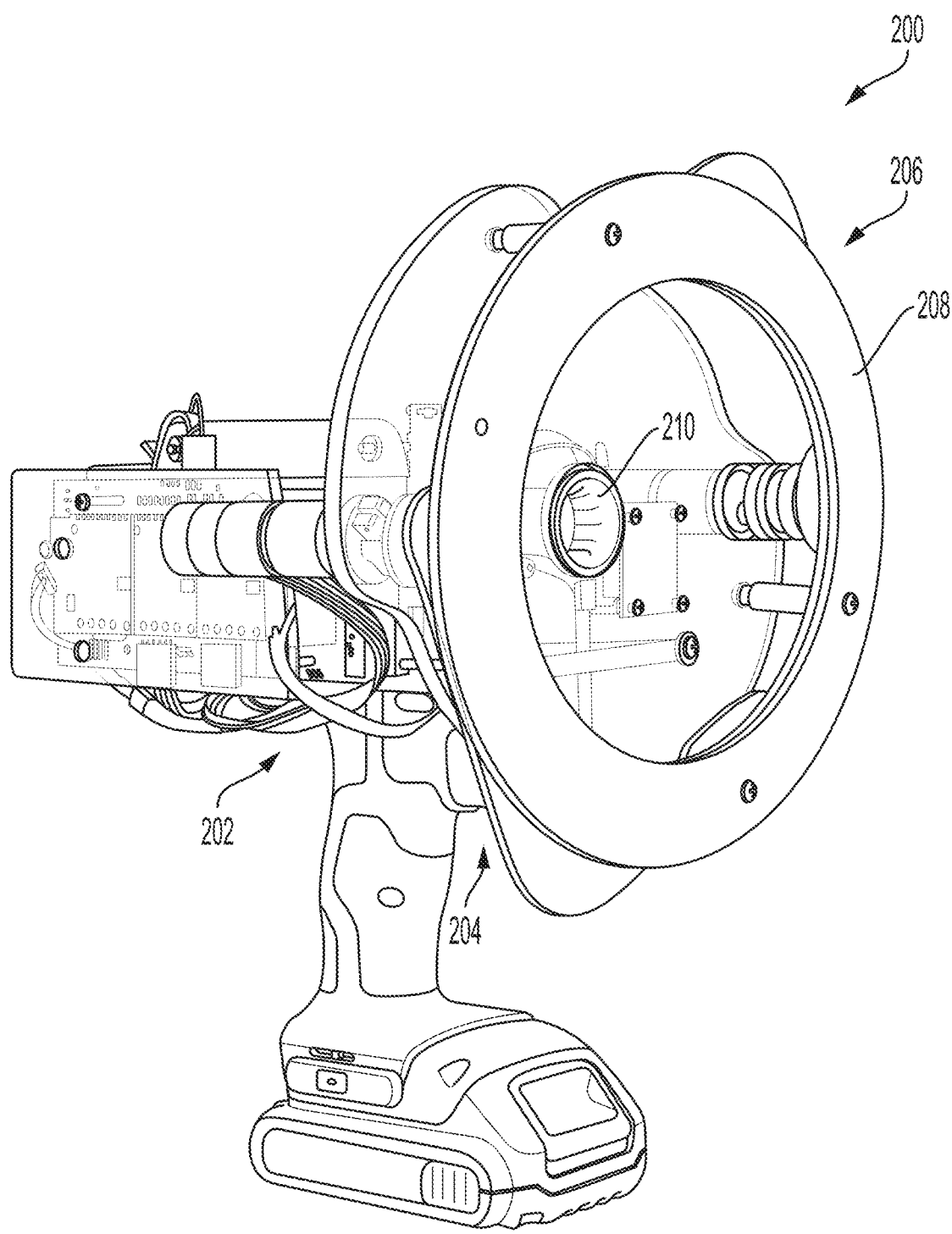
FIG. 2 shows an adjusting device for adjusting a passive drip irrigation valve to enable precision irrigation.

FIG. 2 shows an adjusting device 200 for adjusting a passive drip irrigation valve to enable precision irrigation. The adjusting device 200 includes a device body 202 configured to be at least one of hand-held or attachable to a robot, the device body having a manipulator end 204. The adjusting device 200 further includes a manipulator assembly 206 contained within and extending from the manipulator end 204 of the device body 202. The manipulator assembly 206 comprises a coarse alignment adjustment assembly 208 constructed and arranged to align the adjusting device 200 with the passive drip irrigation valve. The manipulator assembly 206 also includes a fine actuator 210 configured to rotate the passive drip irrigation valve by a specified angle.

Figure 3:
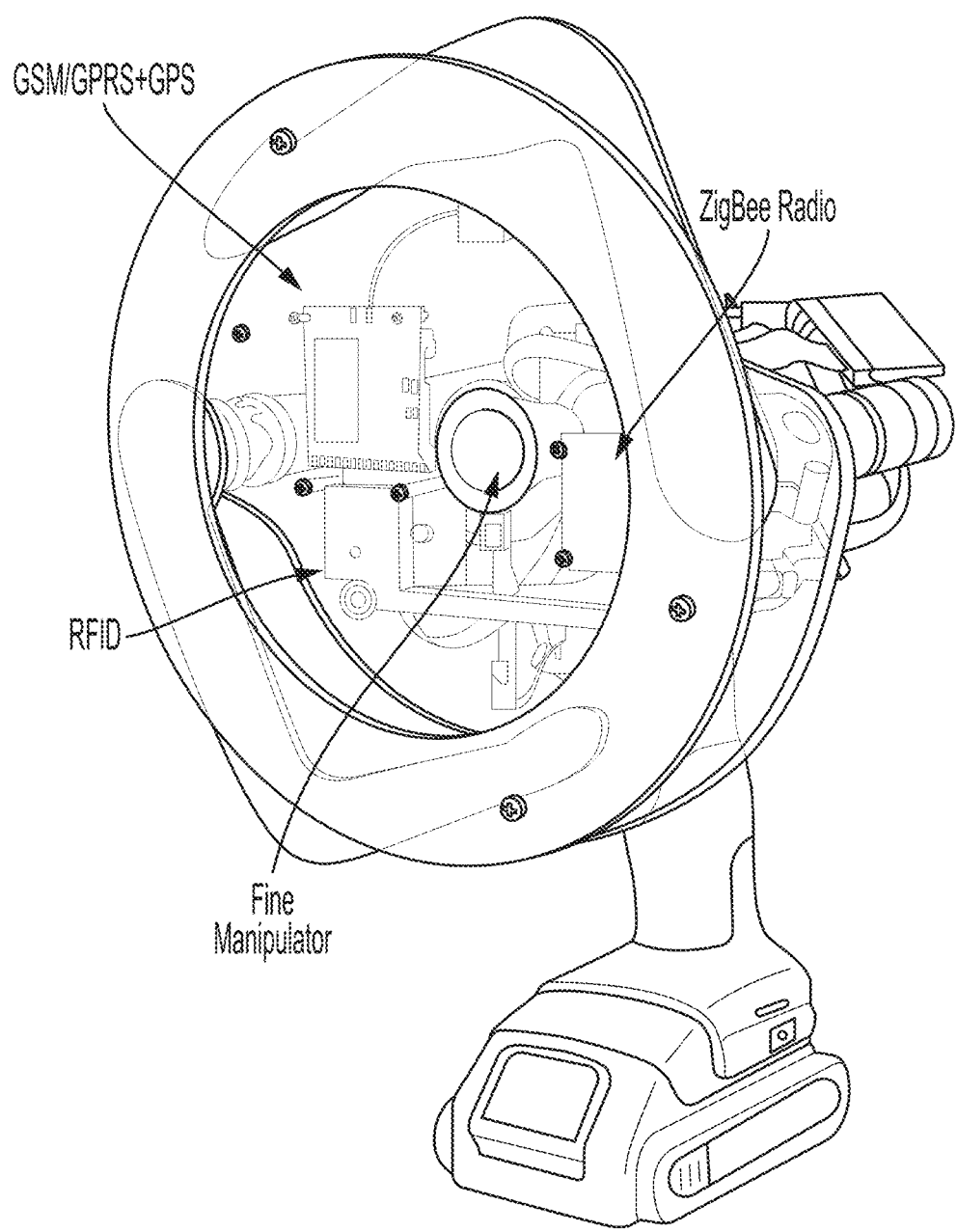
FIG. 3 shows an adjusting device that includes a navigation system disposed on or within the device body.

According to some embodiments of the invention, the adjusting device also includes a navigation system disposed on or within the device body. The navigation system has an accuracy sufficient to guide the adjusting device to a particular passive drip irrigation valve. As shown in FIG. 3, the navigation system can include a global system for mobile communications (GSM)/General Packet Radio Service (GPRS) and Global Positioning System (GPS). The adjusting device can use these systems to determine its own position as well as that of a particular passive drip irrigation valve, and can use them to move to the passive drip irrigation valve. Other types of navigations systems may also be used, and the embodiments of the invention are not limited to GSM/GPRS+GPS.

Figure 4:
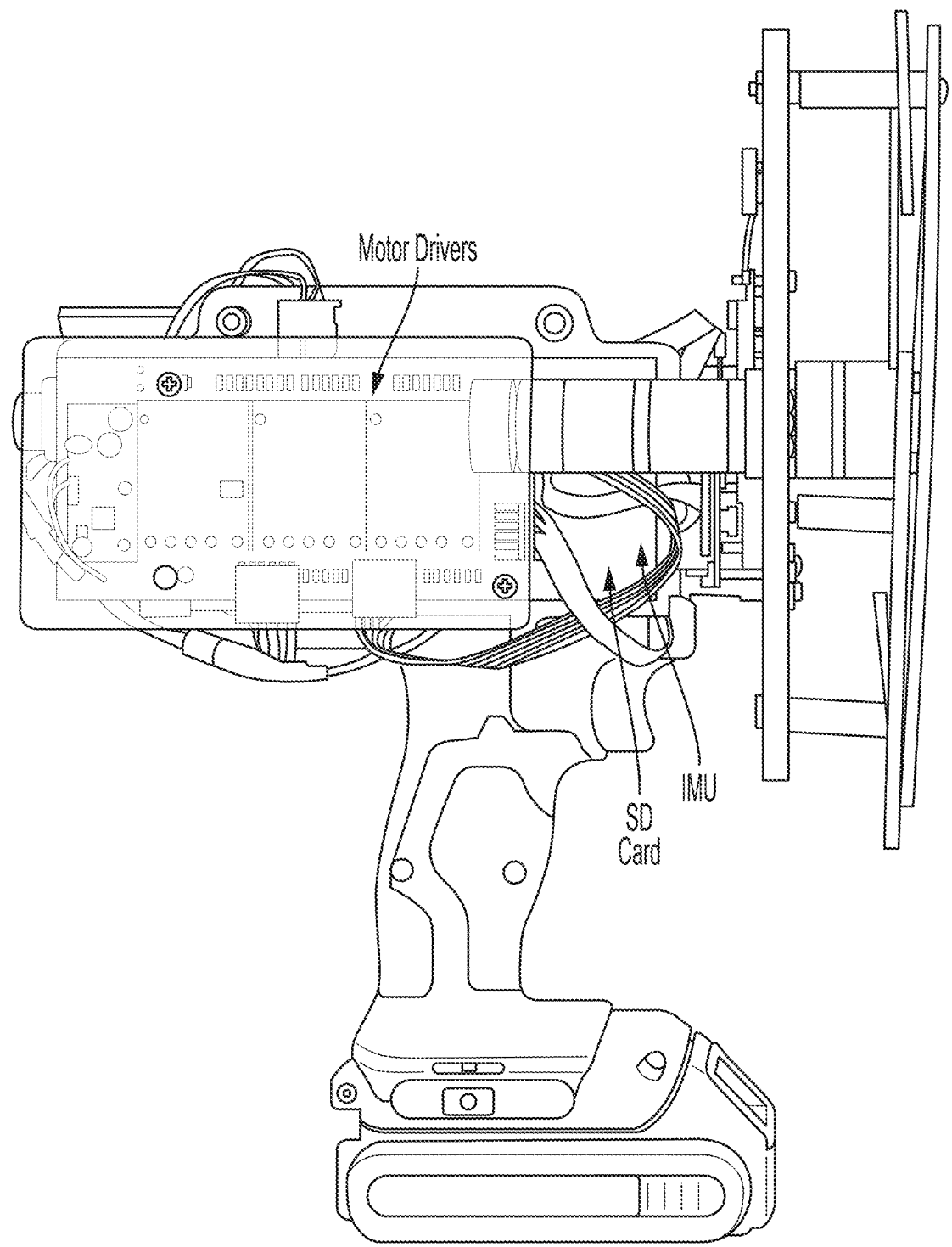
FIG. 4 shows an adjusting device that includes an inertial measurement system (IMS)

As shown in FIG. 4, the navigation can also include an inertial measurement system (IMS). The IMS according to some embodiments is a nine degree of freedom IMS that is used to determine the compass heading of the human worker or robot using the adjustment device in the field.

Figure 5:
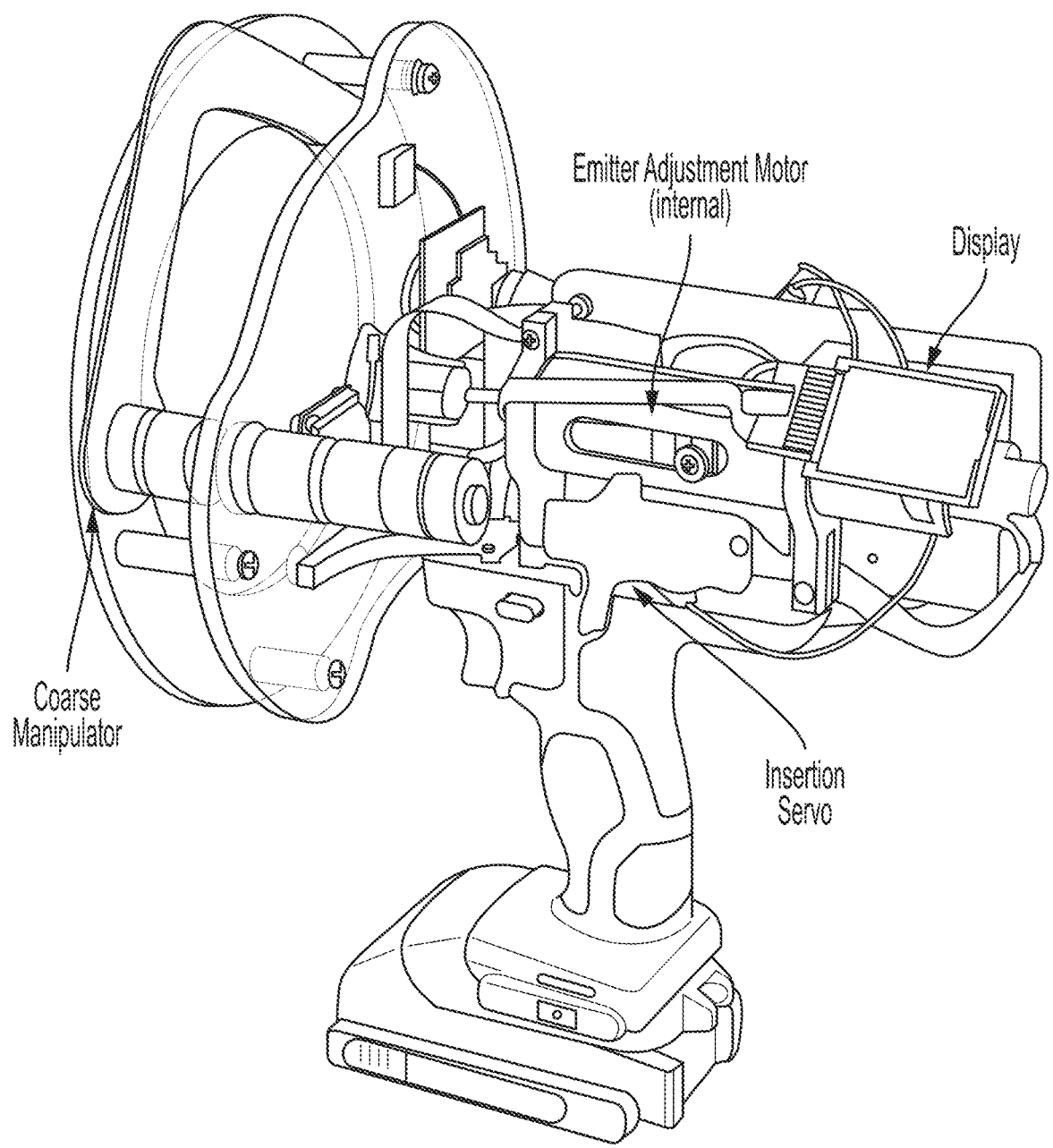
FIG. 5 shows an example of an adjustment device including a display system.

According to some embodiments of the invention, the adjusting device also includes a display system at least one of attached to or integral with the device body so as to communicate with a human user holding the adjusting device, wherein the display system uses at least one of a visual display and audio signals to communicate. FIG. 5 shows an example of an adjustment device including a display system. The display system may provide visual and audio signals to the user indicating a particular passive drip irrigation valve to be adjusted, and an amount by which the adjusting device will adjust the valve. The display system may provide information regarding multiple valves at once, for example, highlighting valves requiring the greatest amount of adjustment, or indicating the adjustments needed for a group of valves in a particular region, for example.

According to some embodiments, the navigation system is configured to provide navigation information to the display system, and the display system is configured to display the navigation information to enable a human user to locate a particular passive drip irrigation valve. The display system may provide an indication of the location of the passive drip irrigation valve with respect to the adjustment device, and may provide visual or audio instructions to a human user for locating the passive drip irrigation valve. The display system may display information received from the IMS. For example, the display system may communicate with the IMS to provide the user with a compass heading indicating a current trajectory, a desired trajectory, or a general direction of the passive drip irrigation valve with respect to the adjustment device.

According to some embodiments of the invention, the display system may also allow a user to communicate with the adjustment device. For example, the display system may have a touch screen, a touch pad, or one or more buttons that allow the user to interact with adjustment device.

According to some embodiments of the invention, the adjustment device includes a wireless receiver disposed within the device body and configured to communicate with an external wireless communication system. The wireless receiver is in communication with the display system, and the display system is configured to display information received via the wireless communication system. The wireless receiver may be one or more of a long-range communication wireless receiver and a short-range communication wireless receiver. For example, the adjustment device may include GSM/GPRS+GPS and a ZigBee radio, as shown in FIG. 3. The GSM/GPRS+GPS may be used for communication with the cloud, while the ZigBee radio may be used to communicate with existing wireless sensors in a 5,000 ft radius of the adjustment device. However, these examples of a wireless receiver are non-limiting, and other types of wireless receivers may be included in the adjustment device.

The adjustment device can use the wireless receiver to receive information from a remote user, a remote database, a sensing system, or adjustment device. For example, the adjustment device may receive from a user, via the wireless receiver, an indication of a desired increase or decrease in the rate of fluid flow through the passive drip irrigation valve. The adjustment device can then determine an amount to rotate the passive drip irrigation valve to achieve the desired increase or decrease, and rotate the passive drip irrigation valve by the determined amount using the fine actuator.

According to some embodiments of the invention, the adjustment device includes a data storage system in communication with the wireless receiver. The data storage system receives updated information via the wireless receiver. The updated information can be one of an amount to adjust the passive drip irrigation valve, and a navigational waypoint for locating the passive drip irrigation valve. For example, if new data is available from a weather station, a UAV, or a satellite, the adjustment device can receive the data and make adjustments to valves based on the most up-to-date information. The adjustment device may rotate the valve using the fine actuator by an amount indicated by the updated information, or may calculate an amount to rotate the device based on the updated information.

The data storage system may store data regarding which passive drip irrigation valves of a plurality of passive drip irrigation valves have been adjusted. The data storage system may store data indicating a current state of one or more passive drip irrigation valves, and a desired state of the valves. The data storage system may store navigational information regarding an agricultural area having a plurality of passive drip irrigation valves that a user may use in combination with the navigation system to locate a particular passive drip irrigation valve. FIG. 4 shows an adjustment system having a data storage system in the form of an SD card. However, the embodiments of the invention are not limited to an SD card, and other types of data storage systems may also be implemented.

Figure 6:
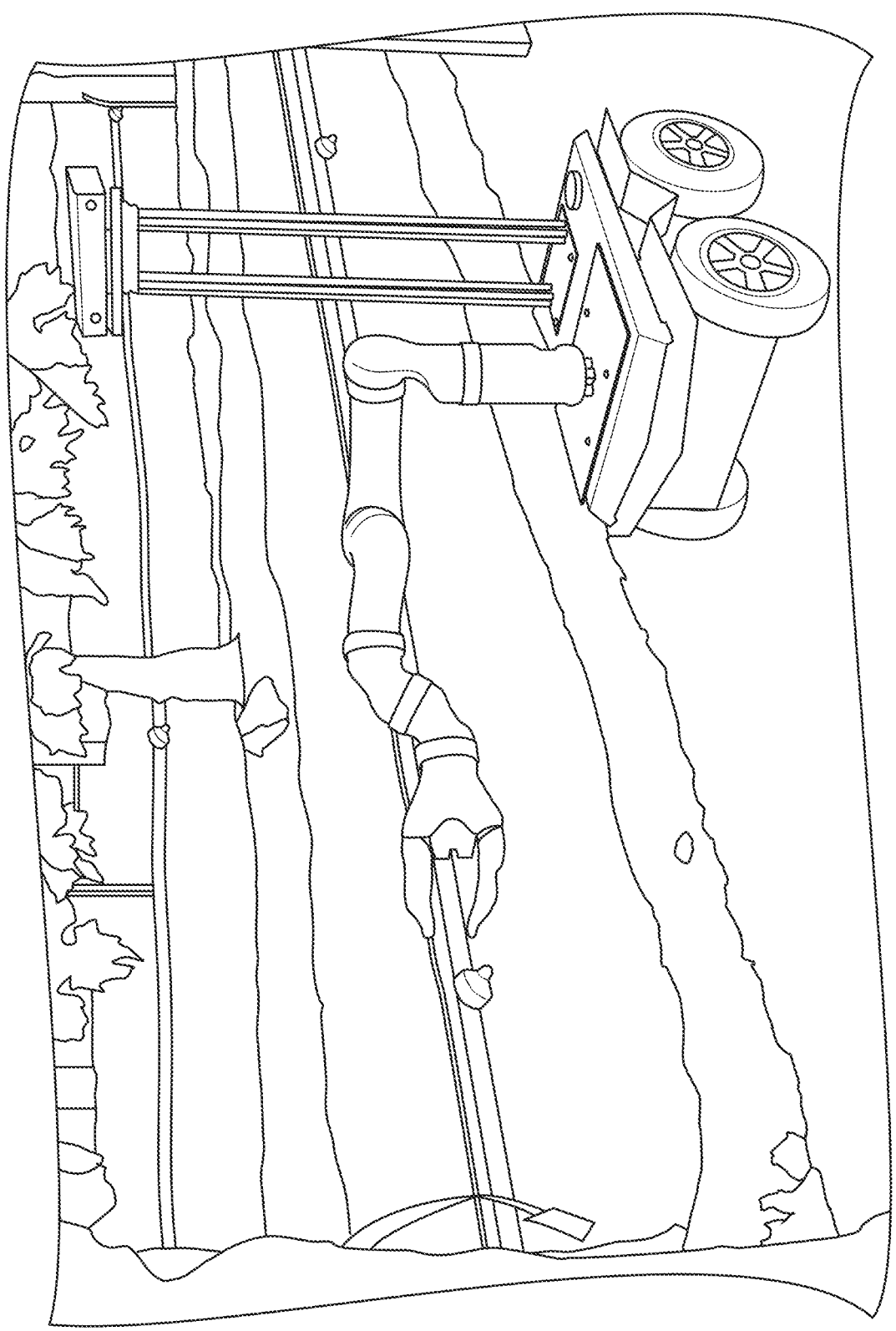
FIG. 6 shows an example of a mobile robot used in an agricultural setting.

According to some embodiments of the invention, the adjusting device is configured to be operated by a mobile robot. FIG. 6 shows an example of a mobile robot used in an agricultural setting. The adjusting device may be configured to be mechanically coupled to the robot, and to communicate with the robot's control system. According to some embodiments, the adjusting device's navigation system is configured to guide the mobile robot to the passive drip irrigation valve. Mobile robots that are currently used in other agriculture-related projects, such as the "Husky," by ClearPath Robotics Inc. http://www.clearpathrobotics.com/husky/, or variations thereof, may be modified to operate the adjusting device. The adjusting device may be attached to a robotic arm of the mobile robot via a universal joint or flexible shaft that allows for misalignment between the robot arm and handle, yet still allows for torque transfer.

According to some embodiments of the invention, the adjusting device includes a radio frequency identification (RFID) system disposed within the device body, as shown in FIG. 3. The RFID system is configured to read an RFID tag fixed at a position proximate the passive drip irrigation valve. Once the adjustment device locates a valve, it can use the valve's RFID tag to confirm that the located valve is the particular valve that the adjusting device intends to adjust. If the RFID tag indicates that the valve is not the valve that the adjusting device intends to adjust, the adjusting device can use the navigation system to move to the intended device. If the RFID tag indicates that the valve is the valve that the adjusting device intends to adjust, the adjusting device can determine how much the valve should be adjusted.

The RFID system can communicate with the data storage system. The data storage system is configured to receive an RFID signal corresponding to the RFID tag fixed at the position proximate the passive drip irrigation valve, and retrieve information from the data storage system regarding the desired angle to adjust the passive drip irrigation valve. The adjusting device can then adjust the valve using the fine actuator. The RFID system can also be used to navigate the device to the valve. For example, the adjusting device can determine the distance between the manipulator end and the passive drip irrigation valve based on the strength of the RFID signal. Methods for determining a distance based on an RFID signal are described in [4]. The adjusting device can use the distance information to engage the fine actuator with the valve. According to some embodiments, the adjusting device includes a camera that provides distance information.

According to some embodiments of the invention, the adjusting device includes an environmental conditions sensor disposed on or within the device body. The environmental conditions sensor collects data regarding an area surrounding the passive drip irrigation valve, and provides the data to the display system. The display system determines an amount to rotate the passive drip irrigation valve based on the data. The environmental conditions sensor can be a visual camera or an infrared camera, a soil probe, or any other sensor for sensing irrigation conditions of an area. The adjusting device may gather irrigation information from the environmental conditions sensor, and may adjust a passive drip irrigation valve based on the gathered information. The adjusting device may further include a data storage system configured to store data collected by the environmental conditions sensor. The adjusting device may include a wireless transmitter configured to transmit data collected by the environmental conditions sensor.

Figure 7:
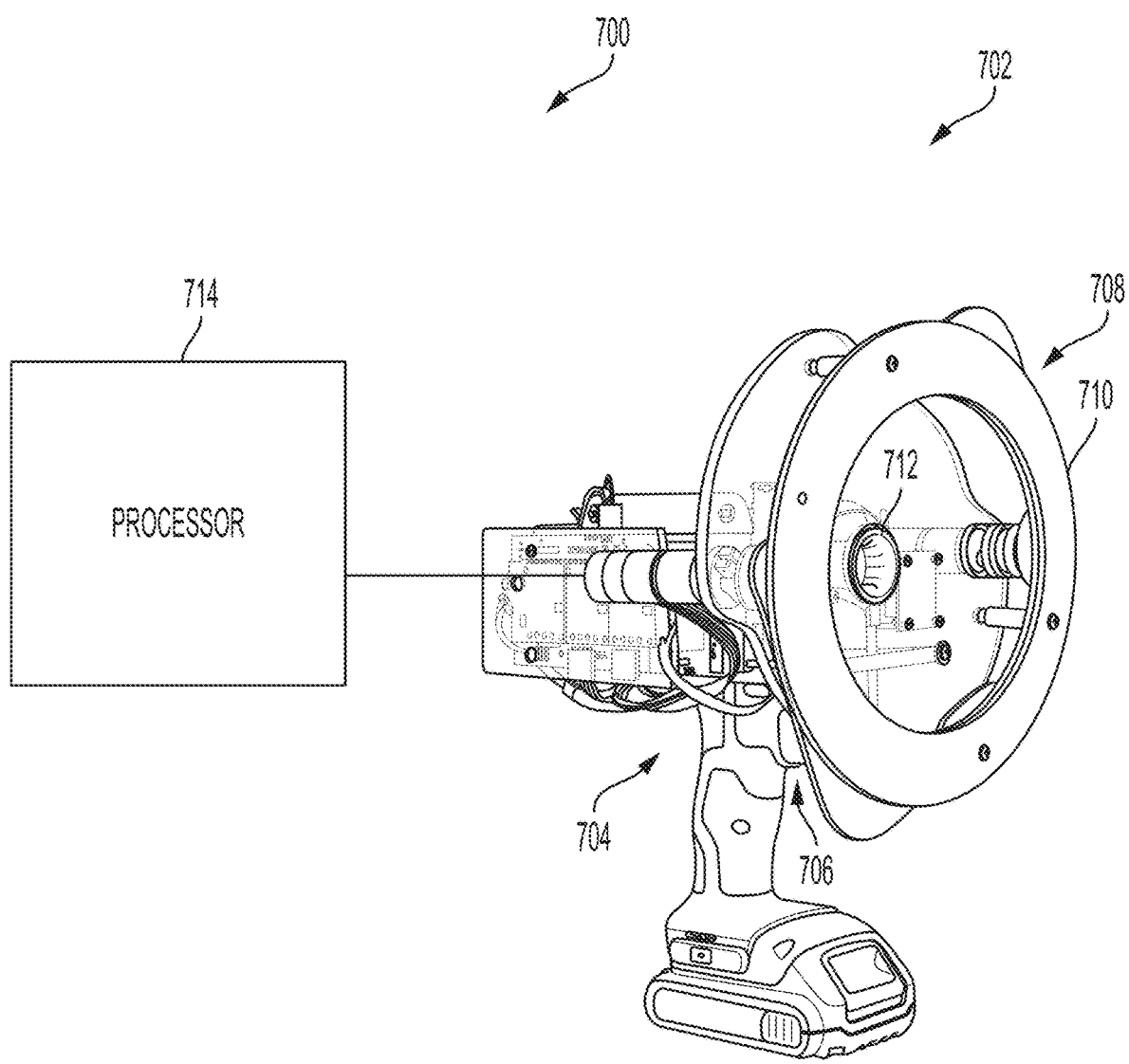
FIG. 7 shows a system for enabling precision irrigation according to some embodiments of the invention.

A system for enabling precision irrigation according to some embodiments of the invention is shown in FIG. 7. The system 700 for enabling precision irrigation includes an adjusting device 702 for adjusting a passive drip irrigation valve. The adjusting device 702 includes a device body 704 configured to be at least one of hand-held or attachable to a robot, the device body 704 having a manipulator end 706, and a manipulator assembly 708 contained within and extending from the manipulator end 706 of the device body 704. The system also includes a processor 714 configured to process irrigation data and communicate with the adjusting device 702 about desired changes to the passive drip irrigation valve based on the processed irrigation data. The manipulator assembly 708 includes a coarse alignment adjustment assembly 710 constructed and arranged to align the adjusting device 702 with the passive drip irrigation valve, and a fine actuator 712 configured to rotate the passive drip irrigation valve by a specified angle.

According to some embodiments, the processor is configured to receive the irrigation data from a database. According to some embodiments, the system for enabling precision irrigation includes an irrigation measurement system in communication with the processor, wherein the processor is configured to receive the irrigation data from the irrigation measurement system. The irrigation measurement system includes a network of sensors distributed in an agricultural setting. According to some embodiments, the irrigation measurement system includes a remote sensing system configured to provide image data, wherein the processor is configured to process the image data to obtain the irrigation data.

Figure 8:
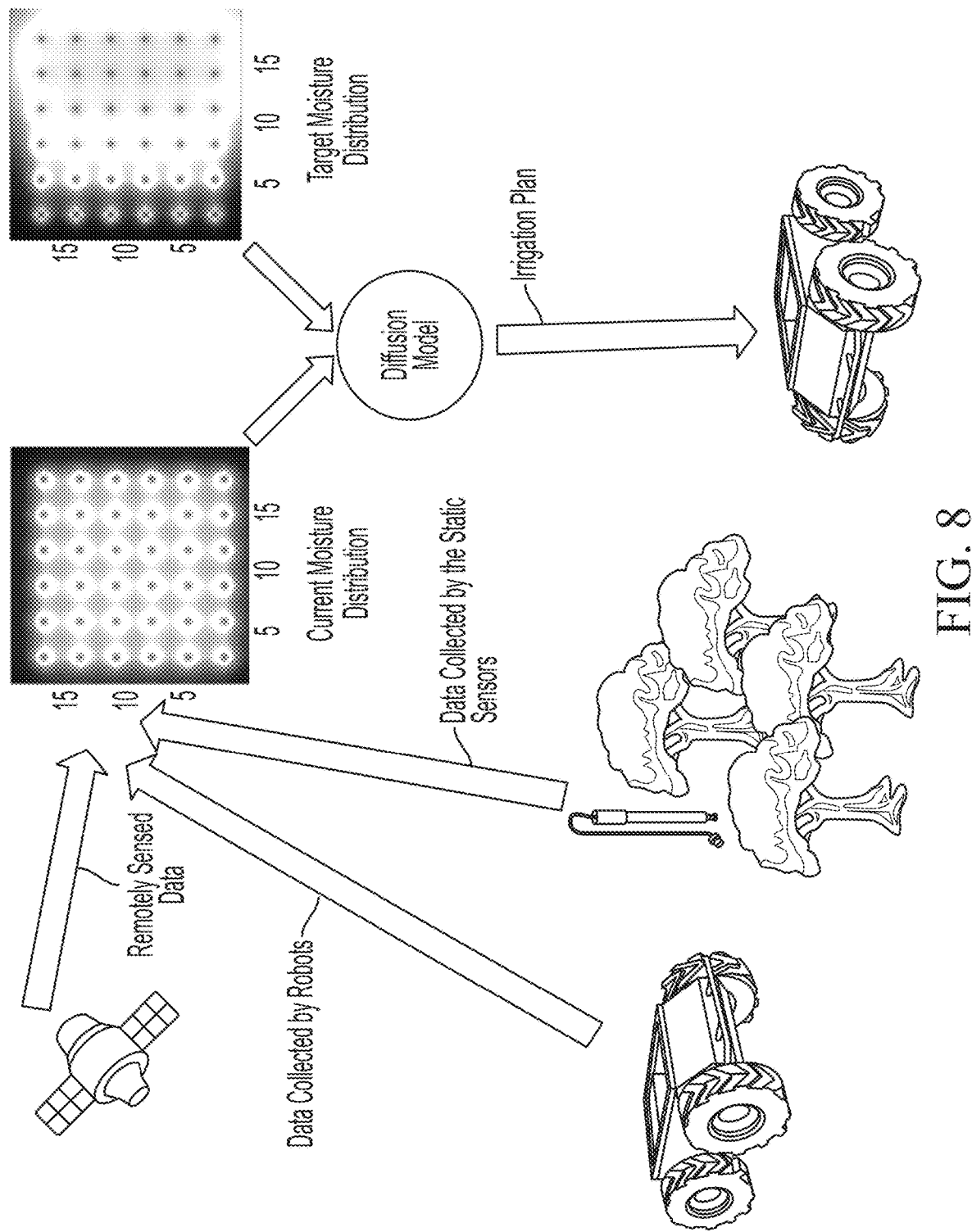
FIG. 8 shows an example of a system for enabling precision irrigation that includes a number of sensors collecting irrigation data.

FIG. 8 shows an example of a system for enabling precision irrigation according to some embodiments. The system includes a number of sensors collecting data. The processor receives data collected by static sensors, data collected by mobile robots, and remotely sensed data, and processes the data to determine an amount to adjust the passive drip irrigation valves. For example, the processor may compare the current moisture distribution to a target moisture distribution to identify the valves for adjustment. The processor then provides the adjusting device with information regarding which passive drip irrigation valves should be adjusted, and by how much.

The processor can be a dedicated "hard-wired" device, or it can be a programmable device. For example, it can be, but is not limited to, a personal computer, a work station, or any other suitable electronic device for the particular application. In some embodiments, it can be integrated into the adjusting device, or it can be attachable, remote, and/or distributed.

According to some embodiments, the system for enabling precision irrigation includes a precision irrigation system. The precision irrigation system comprises a network of irrigation pipes in fluid connection with a plurality of passive drip irrigation valves, as shown in FIG. 1. The network of irrigation pipes transport water from a water source to the individual passive drip irrigation valves. Each passive drip irrigation valve has a shape that enables the fine actuator to connect to the valve and apply a torque to rotate the valve to increase or decrease the rate of fluid flowing through the valve. Examples of passive drip irrigation valves are described in more detail below.

According to some embodiments of the invention, the system for enabling precision irrigation includes a user interface in communication with the processor. The user interface can be configured to receive an indication from a user of an area for which a rate of irrigation is to be adjusted and a desired rate of irrigation. The user interface may allow the user to communicate with the processor or the adjusting device from a remote location. For example, the user interface may be a computer that communicates with the processor and the adjusting device via a wireless communication system. The user interface may allow the user to select an area for irrigation to be adjusted. The area may be a section of a field or orchard, for example, or a single plant or group of plants. Alternatively, the user may select particular valves or groups of valves to be adjusted. The user interface may allow a user to indicate a desired irrigation characteristic for all plants in the agricultural area, and the processor may identify which valves need to be adjusted to meet the irrigation characteristic. The irrigation characteristic may be determined by an irrigation measurement system, and may be based on the analysis of an image of a plant or the content of a soil sample, for example. The adjusting device can then determine the location of the passive drip irrigation valves to be adjusted, and an amount to rotate each valve to achieve the desired irrigation characteristic.

Figure 9:
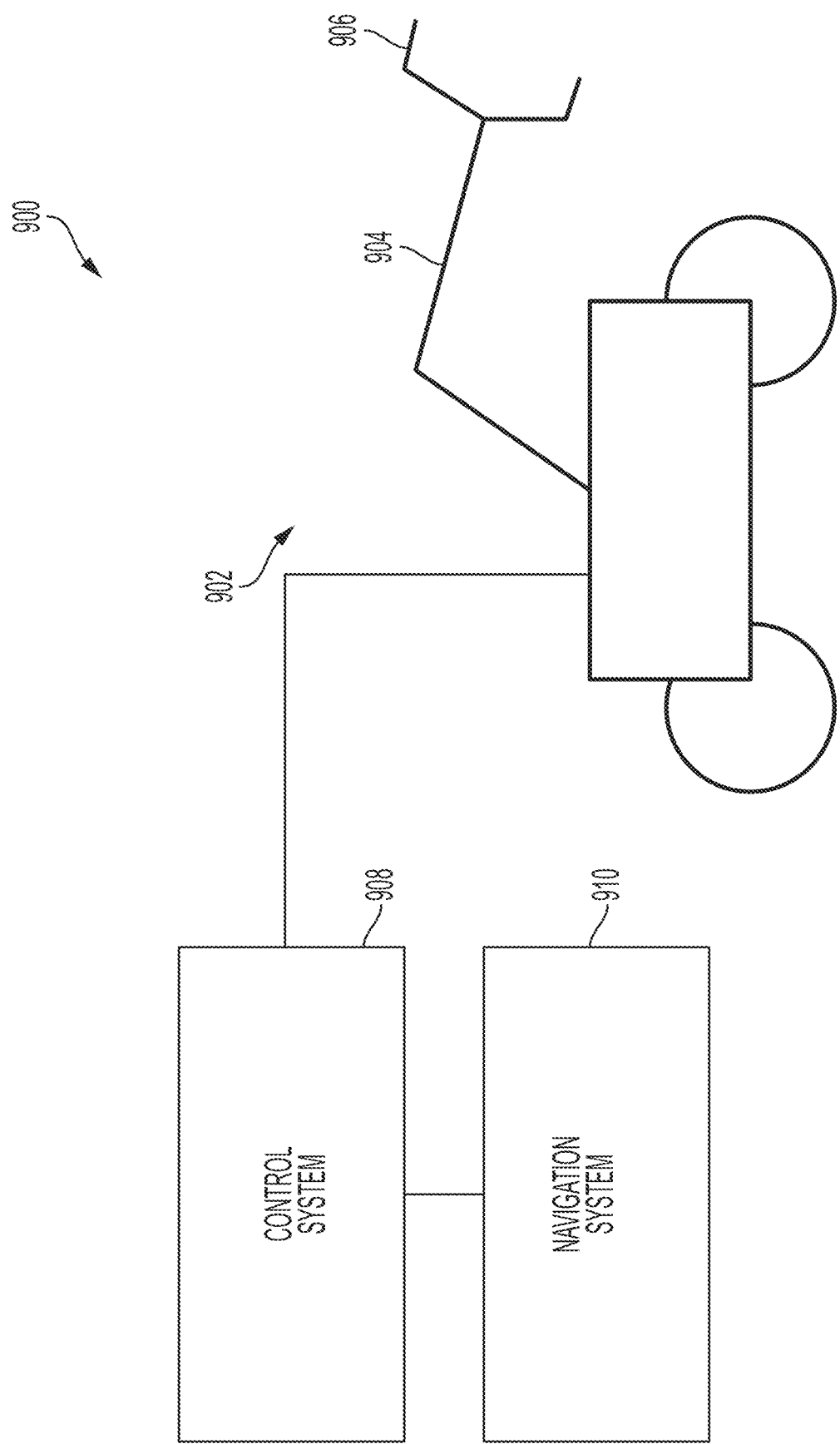
FIG. 9 shows a robotic system 900 for precision irrigation according to some embodiments of the invention.

FIG. 9 shows a robotic system 900 for precision irrigation according to some embodiments of the invention. The robotic system 900 includes a mobile robot 902 that has a robot arm 904. The robot arm 904 has an actuator 906 configured to connect to and manipulate a passive drip irrigation valve. The robotic system 900 also includes a control system 908 in communication with the mobile robot 902, and a navigation system 910 in communication with the control system 908. The control system 908 is configured to identify a location of the passive drip irrigation valve based on information received from the navigation system 910. The control system 908 is further configured to instruct the mobile robot 902 to connect to and manipulate the passive drip irrigation valve to adjust a rate of fluid flow through the valve.

According to some embodiments, the control system 908 is configured to determine, based on irrigation data, an amount to rotate the passive drip irrigation valve to adjust the rate of fluid flow through the valve by a predetermined amount, and instruct the mobile robot 902 to rotate the valve by the determined amount. For example, the control system may be configured to use an algorithm to calculate an amount of rotation required to bring about a desired change in fluid flow. Alternatively, the control system may use a look-up table to determine the rotation required to bring about the desired change.

According to some embodiments, the control system 908 is configured to determine which route of a plurality of possible routes for moving to and adjusting a plurality of passive drip irrigation valves is most time-efficient, and instruct the mobile robot 902 to move to and adjust the plurality of passive drip irrigation valves according to the determined route. The control system 908, using data from the navigation system 910, may compare the location of the mobile robot 902 to the location of the plurality of passive drip irrigation valves, and may plan a route for the mobile robot 902 to move through the agricultural area to arrive at each of the plurality of passive drip irrigation valves. The control system 908 and/or navigation system 910 may store information regarding the layout of the agricultural area, as well as obstructions to be avoided and clear pathways for accessing valves. The control system 908 may then compute a route for visiting each of the passive drip irrigation valves that enhances the efficiency of the human or robot operating the adjustment device.

The robotic system for precision irrigation may further include additional features described above with reference to the adjusting device, such as a wireless receiver, a display system, a data storage system, an RFID system, a wireless transmitter, and/or an environmental conditions sensor, for example.

Passive Drip Irrigation Valves

The valves employed in this system may be low cost, passive mechanical water valves. The use of such low cost valves permits many valves to be installed throughout a planting region. This can even allow for one or more valves to provide water for a single plant. The valves are designed to be easily operated by an adjusting device to facilitate periodic adjustment of water flow.

The valves do not rely on electronics and thus may be produced at low cost. According to some embodiments, a valve is designed to be easily retrofitted into existing drip irrigation systems. The link http://www.sprinklerwarehouse.com/Rain-Bird-PGA-Series-Valves-s/450.htm displays some available irrigation valve designs that could be modified for implementing the precision irrigation system. The passive handle configuration is modified to facilitate detection and manipulation by the adjusting device.

A feature of the precision irrigation system according to some embodiments is the introduction of an adjusting device into the control scheme. The adjusting device enables a user to control exactly how much water flows through the valve. Instead of the user guessing how much a valve handle should be turned, and then attempting to turn the handle the exact amount by hand, the adjusting device determines a valve rotation corresponding to a desired change in fluid flow, and then robotically actuates the rotation of the valve handle. Because the system depends on a controlled interaction between the valve and the adjusting device, the valves are designed to enable localization and actuation of the valve by the adjusting device.

Figure 10:
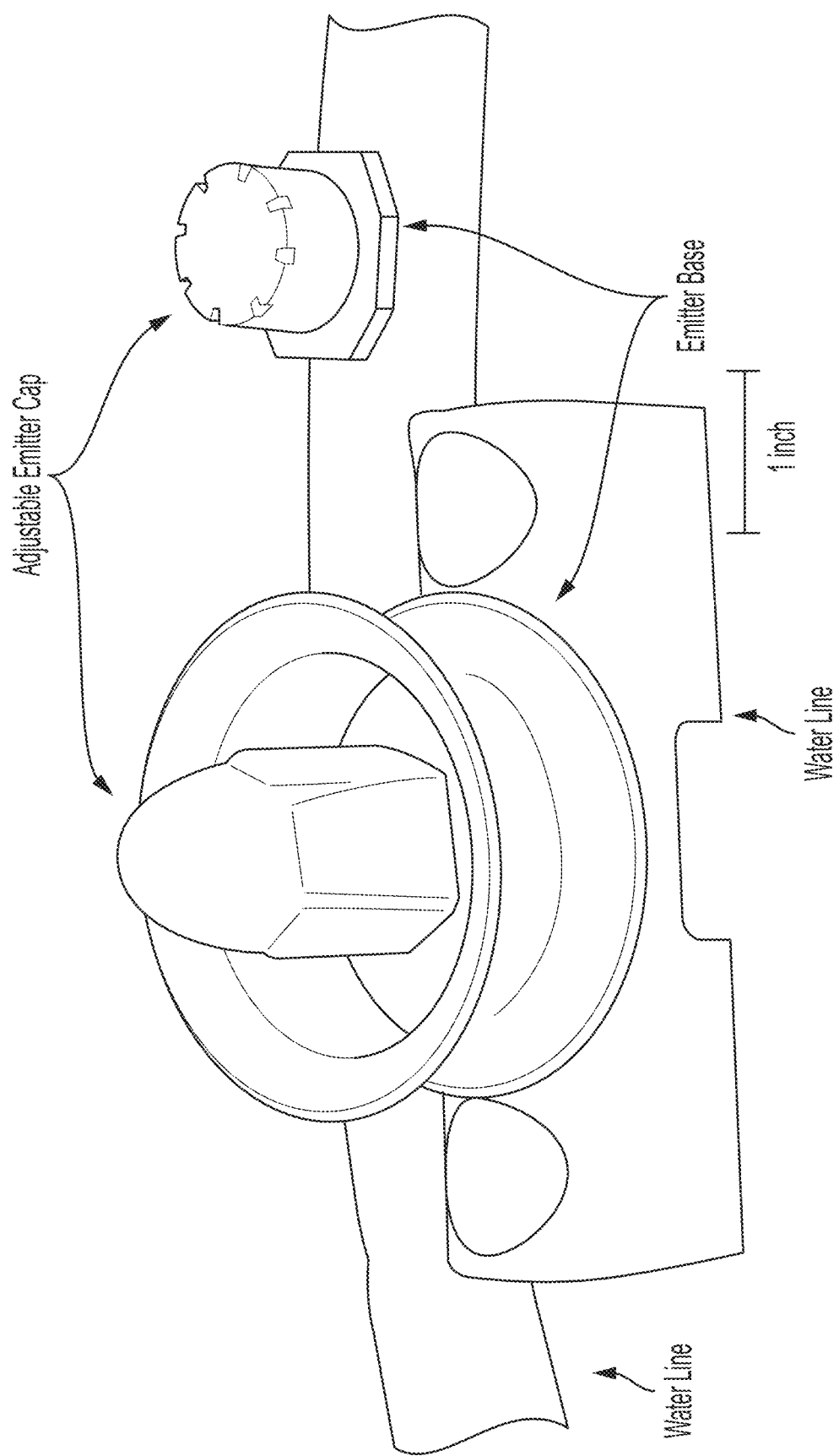
FIG. 10 shows a passive drip irrigation valve according to some embodiments of the invention.

A passive drip irrigation valve according to some embodiments of the invention is shown in FIG. 10. The valve is designed to facilitate mechanical alignment to and adjustment by the adjusting device, which can be either hand-held or mounted on a mobile robot. The valve shown in FIG. 10 is designed to replace a drip emitter with a shell for mating to the coarse alignment adjustment assembly of the adjusting device, as well as a specifically shaped cap to guide the fine actuator.

According to some embodiments, the valve is designed to facilitate detection and localization with robot sensors using for example visual or RF markers, and with additional markings to facilitate grasping at a desired orientation. The adjusting device reliably grasps the valve handle and applies torque to adjust its setting corresponding to a desired flow level. According to some embodiments, the desired flow level is one of a set of predefined flow levels. The valves are designed to also facilitate operation by human workers when necessary.

Figure 11:
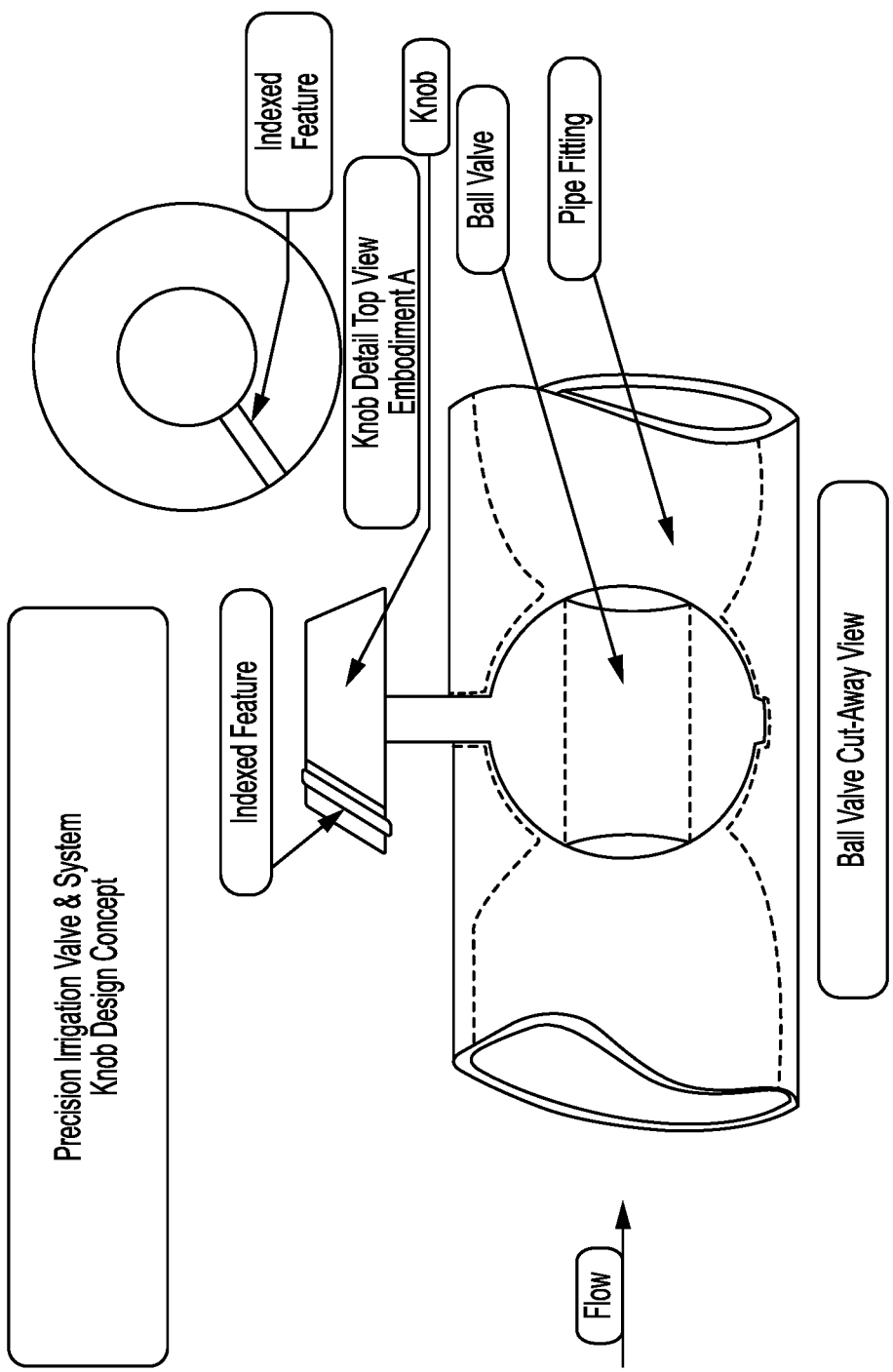
FIG. 11 illustrates an additional passive drip irrigation valve according to some embodiments of the invention.

FIG. 11 illustrates an additional passive drip irrigation valve according to some embodiments of the invention. The passive drip irrigation valve comprises a ball-valve design to allow for continuous variation in flow volume. As shown in FIG. 11, the valve includes a knob or handle that is provided with an indexed feature for cooperating with a corresponding indexed feature in an adjusting device. This provides a form fit connection that enables positive engagement with the handle to facilitate torque transfer from the adjusting device to the valve handle.

The indexing feature that enables the application of torque to the valve can be magnetic. For example, a small permanent magnet is affixed to one position of the valve, and when the adjusting device comes near, the magnet attracts a detent to create a torque transfer. The indexing feature can also be a physical feature, such as pattern on the valve that indexes with a pin on the adjusting device, allowing for the transfer of torque. The indexing feature can be friction-based, such as a conical handle that mates with a conical gripper for transferring torque. The indexing feature can be splined, such that the handle takes the shape of a gear which the gripper engulfs and mates with, transferring torque. The embodiments of the inventor are not limited to these examples, and other designs for valves which allow for the rate of fluid flow through the valve to be adjusted may also be used.

According to some embodiments, the indexing feature also includes a fiducial marker that allows the adjusting device to determine the valve's current setting before it alters the valve's state. The functionality of the fiducial mark and the torque transfer element can be combined into one form, thus allowing the robot to mate with the valve's handle in only one orientation. However, embodiments of the invention can also include valve handles that do not include an indication of the valve's current position, and the adjusting device can rely on other methods for determining the current position of the valve.

Adjusting Device

The adjusting device has a design that allows it to engage with and rotate the passive drip irrigation valve. This requires the adjusting device to determine the valve's position, and instruct the manipulator assembly to engage the valve, and then actuate the valve. According to some embodiments, the adjusting device includes a camera and range finder (such as an RGB-D camera or RFID sensor) that can discern a distance between the manipulator assembly and the valve, and provide data to the adjusting device that enables is to approach and engage with the valve. The camera may also track the fiducials (indexing features) on the valve.

Figure 12A:
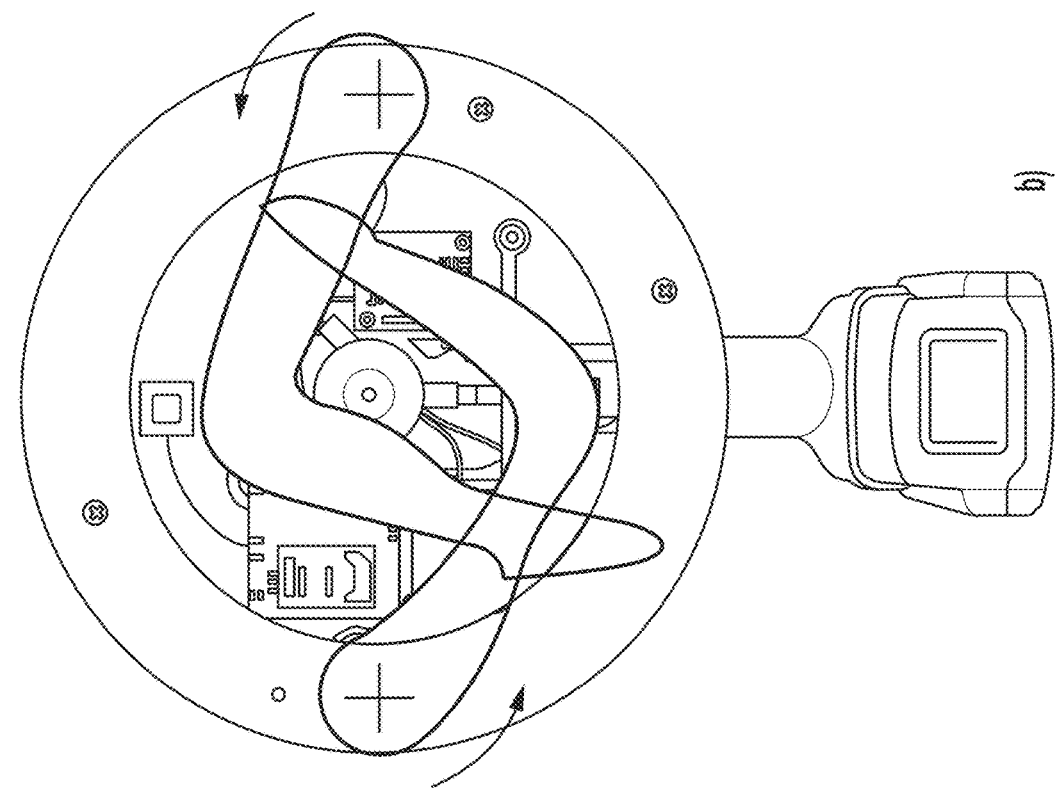
FIG. 12A shows a coarse alignment adjustment assembly comprising two rotatable arms.
Figure 12B:
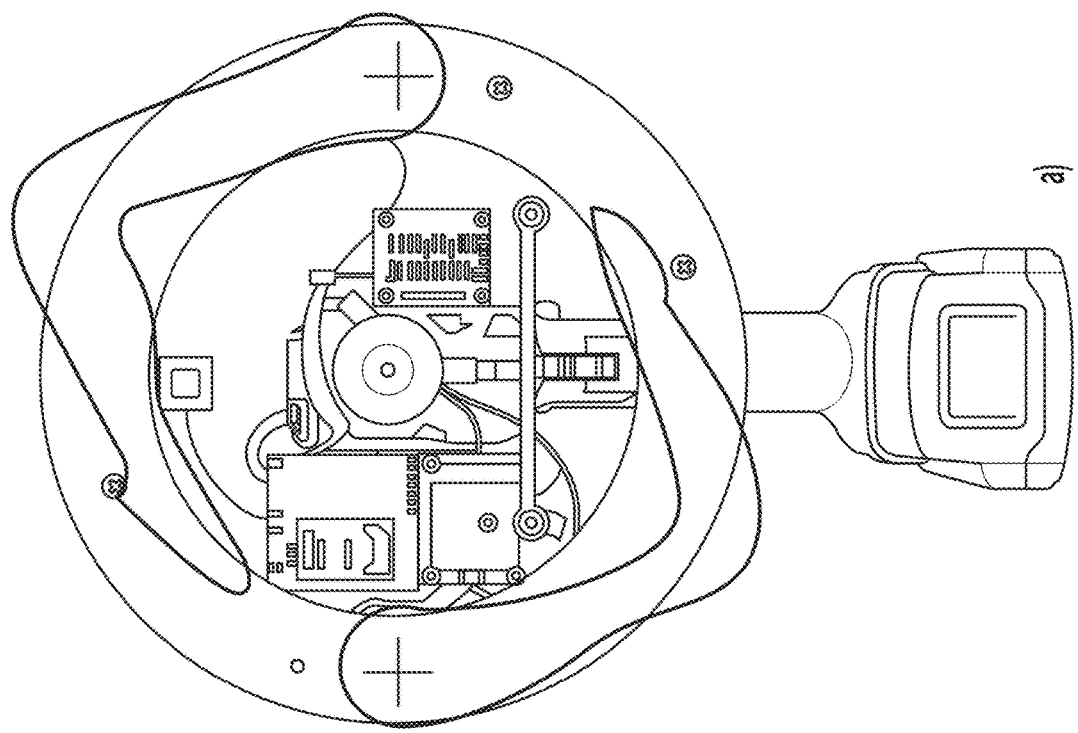
FIG. 12B shows how the arms of the coarse alignment adjustment assembly rotate to center the adjustment device on the valve.
Figure 13:
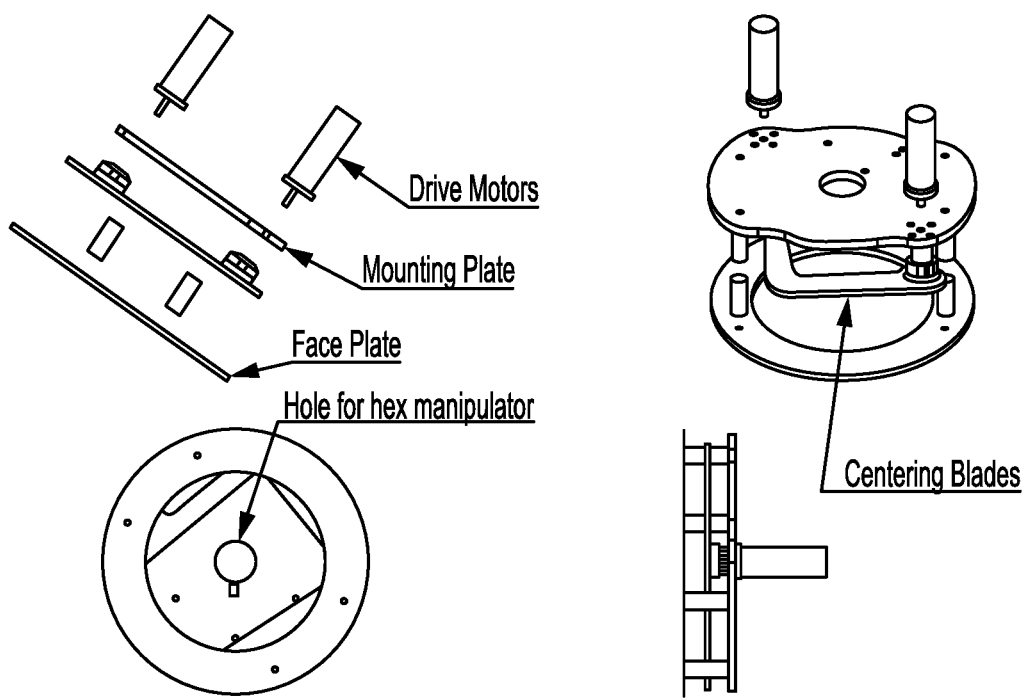
FIG. 13 is a schematic illustration of the coarse alignment system.

An adjusting device for performing precision irrigation according to some embodiments of the invention is shown in FIGS. 2-5. The adjusting device uses a two-stage alignment mechanism to mate the fine actuator with the valve. The adjusting device includes a coarse alignment adjustment system that has two arms that align the adjusting device with the passive drip irrigation valve. The coarse alignment process is illustrated in FIGS. 12A and 12B. As the arms rotate, the space between then becomes smaller, centering the adjustment device on the valve. A schematic illustration of the coarse alignment system is provided in FIG. 13.

Figure 14:
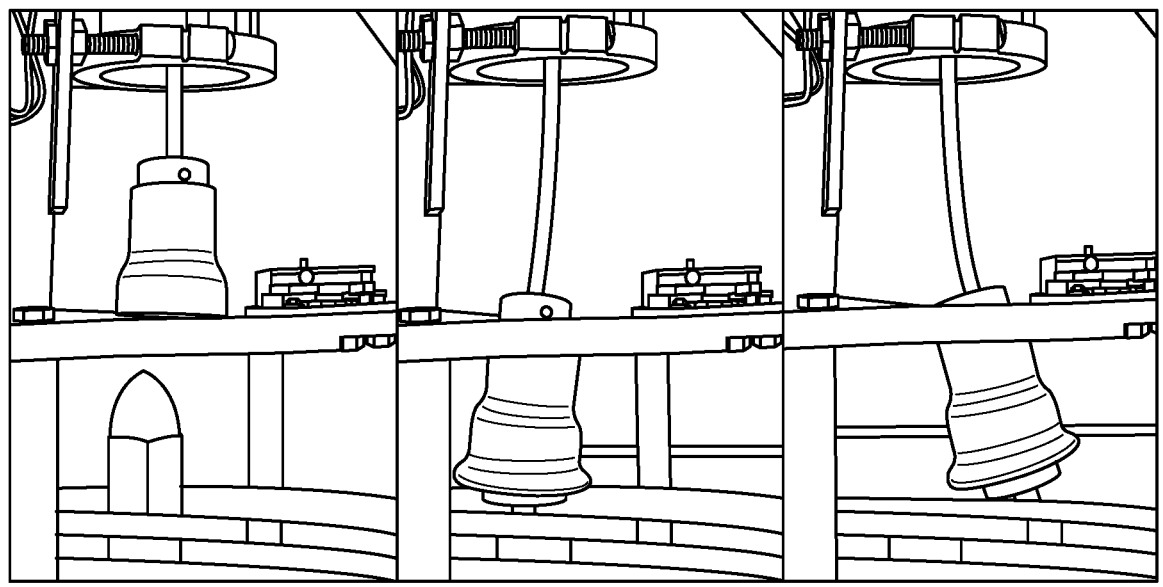
FIG. 14 shows the process of coupling the fine actuator with the valve body using a hexcentric shaped driver mounted on a flexible shaft.
Figure 15:
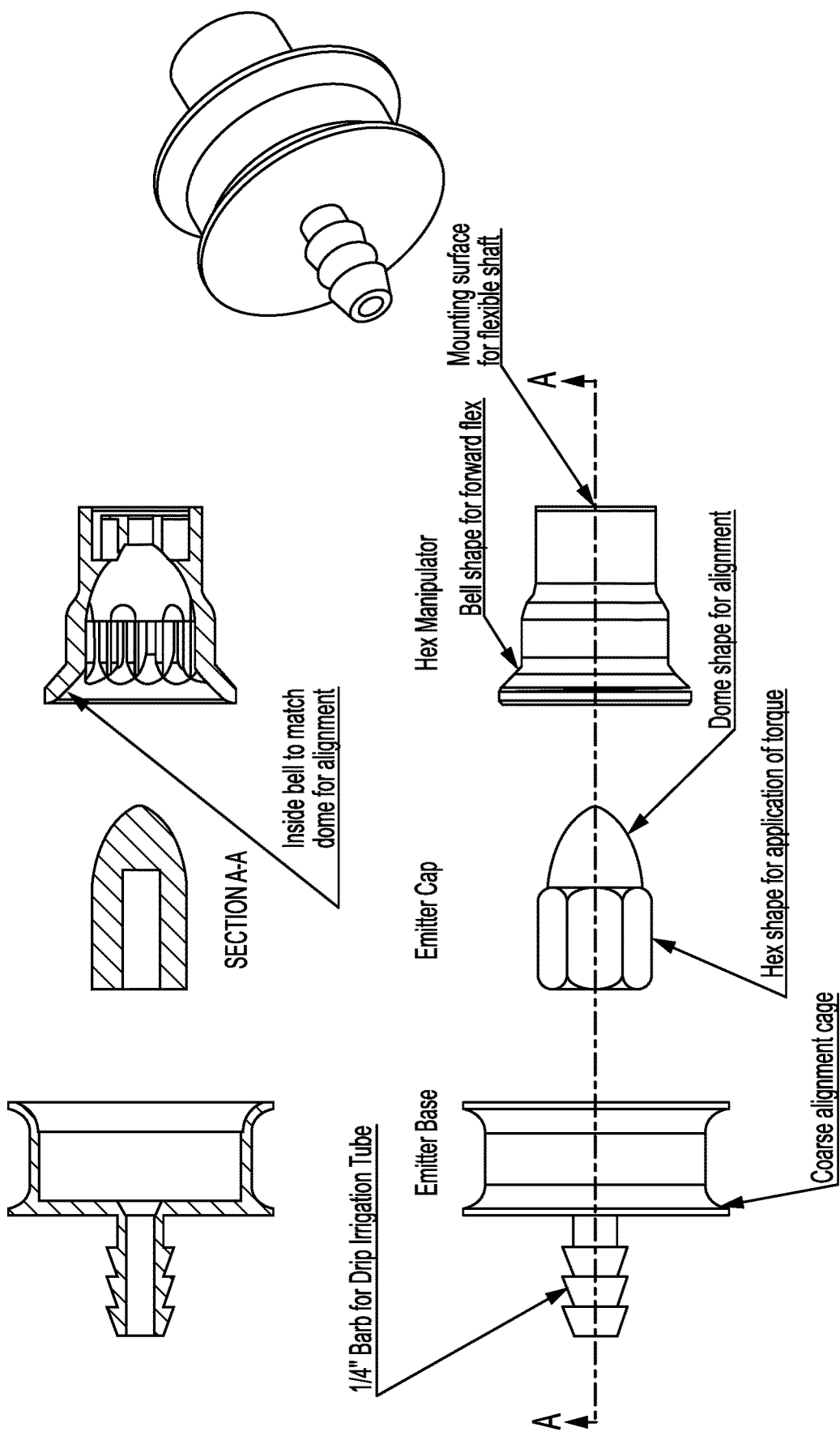
FIG. 15 is schematic illustration of the fine manipulator and the hexcentric passive drip irrigation valve according to some embodiments of the invention.

Once the adjusting device has been coarsely aligned with the valve, the RFID sensor reads the valve's RFID tag and correlates its upcoming adjustment with the known valve number. Then the fine manipulator extends forward, coupling the device's driver with the valve body using a hexcentric shaped driver mounted on a flexible shaft. This processes is shown in FIG. 14. The fine manipulator is bell shaped to mechanically guide itself onto the target valve, overcoming positional as well as angular misalignment, as shown in FIG. 14. A schematic illustration of the fine manipulator and the hexcentric passive drip irrigation valve according to some embodiments is shown in FIG. 15. A positive engagement is determined by a rise in motor torque and is determined in software, but could use low cost torque/force sensors as well other sensors in order to determine when the device has fully engaged.

Figure 16:
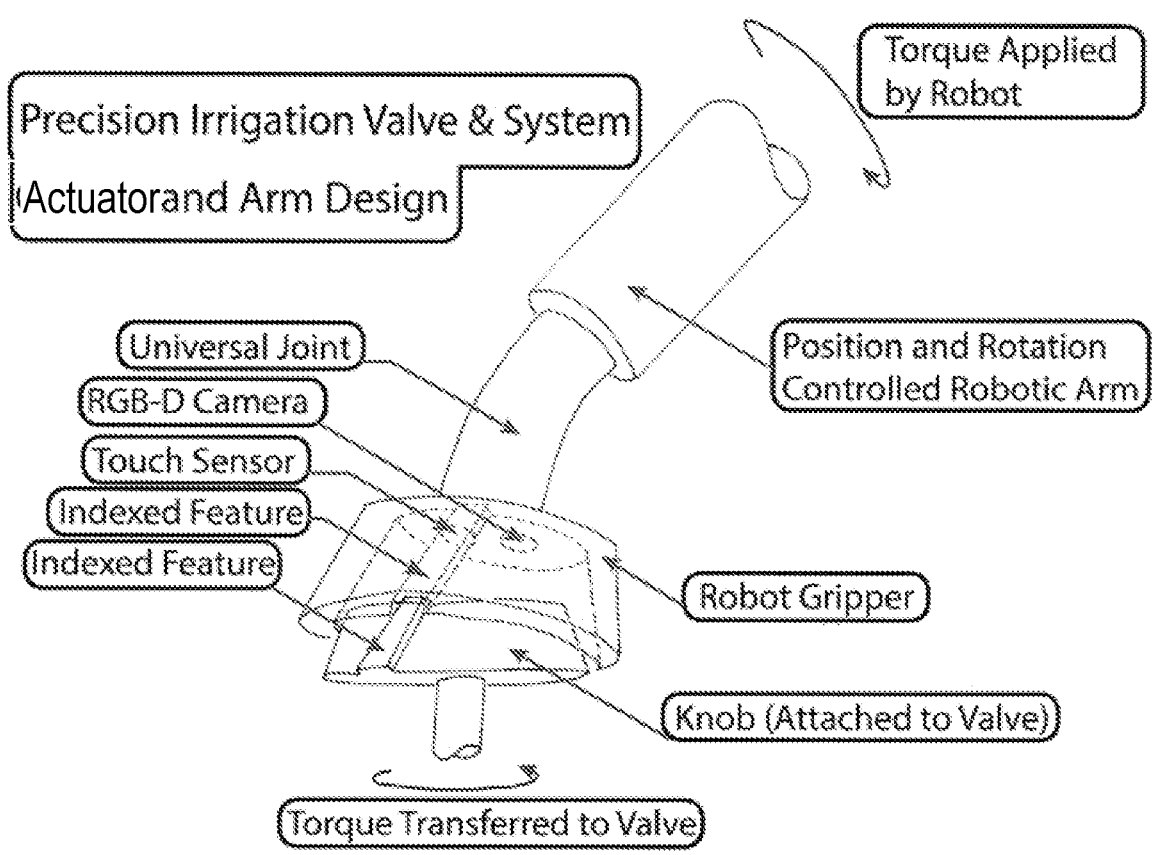
FIG. 16 shows an adjusting device according to some additional embodiments of the invention.

An adjusting device according to some additional embodiments of the invention is shown in FIG. 16. The adjusting device is configured to engage a passive drip irrigation valve like the one shown in FIG. 11. The gripper performs the combined function of the coarse alignment adjustment assembly and the fine actuator. According to some embodiments, the adjusting device includes a touch sensor (such as a binary switch) to enable the adjusting device to discern a positive engagement with the valve, at which point torque can be applied to the valve. According to some embodiments, the adjusting device may include a torque sensor to enable the adjusting device to discern the precise period over which torque is applied to the valve. The torque sensor may be a low cost torque sensor that measures an applied torque as a function of time.

According to some embodiments, the adjusting device may be made of magnetic or electromagnetic materials to ensure positive engagement between the valve and the fine actuator. In these embodiments, the valve may made out of a ferrous or magnetic material.

Electronics and software on board the adjusting device connect control decisions made by the external software system to physical adjustments on the ground by identifying individual valves through RFID. GPS and a compass help navigate the user through an optimal path through feedback using the on-board display. The adjusting device can be mounted at the end of an extendable device in order to reduce user strain.

Sensing Irrigation Conditions

The effectiveness of precision irrigation systems relies in part on the ability to sense and predict plant water stress or soil moisture. The problem of spatially varying moisture measurement and simulation has been extensively studied [32] using models based on finite differences, nonlinear differential equations and partial differential equations. Temporal variability has been considered in [38]. Methods specifically aiming at modeling subsurface moisture with drip irrigation have been developed and experimentally validated [22]. Building upon these models, several simulation packages are available for modeling surface, subsurface, and groundwater flow. Software packages like HYDRUS 2D/3D [6] have been used for modeling flow and designing drip irrigation systems [29]. However, once these systems are in place there is no commercially viable method for actuating water output levels on a per-plant basis. Such methods can be employed in the embodiments of the present invention to predict irrigation conditions and needs.

Embodiments of the invention can also use a variety of sensors to sense current irrigation conditions. Different sensing modalities for estimating plant water availability across vineyards has received a lot of attention, and there is a rich history regarding soil moisture measurement techniques [30]. Recently, airborne thermal imagery has been used to assess the spatial variability of water stress, an indicator of soil moisture availability, across vineyards [12], as well as soil moisture probes based on soil electroconductivity. Wireless sensor networks (WSN) have been proposed for environmental monitoring and applications in agriculture [37].

A WSN composed of 135 soil moisture and 27 temperature sensors was deployed in an apple tree orchard of about 5000 $m^2$ [26]. The network is in charge of estimating soil moisture, but does not include an actuation subsystem capable of adjusting the application of water. A similar system was proposed in [27] where it was demonstrated that current sensing technology is mature to determine soil moisture levels.

Information regarding soil moisture level and evapotranspiration can be obtained using soil probes, near infrared (NIR) cameras, thermal sensors mounted on robots, UAV's, weather information, satellite imagery, or online services like the California Irrigation Management Information System (CIMIS) [5]. Although such information can be used to inform irrigation plans, conventional irrigation control is still accomplished commercially at the (coarse) block level [16]. Some embodiments of the invention use the data to control irrigation on a much smaller scale, and even on a per-plant basis.

Additional agricultural monitoring devices and methods can be utilized by or incorporated into the precision irrigation system according to some embodiments. For example, drones made by 3D Robotics of Berkeley, Calif. (http://3drobotics.com) and Precision Hawk of Raleigh, N.C. (http://www.precisionhawk.com/) and others may be employed to do agricultural monitoring. These companies rely on UAVs for aerial surveys and data collection, which could easily be adapted for agricultural monitoring. Alternatively, ground based robotic platforms are being developed for agricultural monitoring operations, Companies active in this area include Blue River Technology, FrootBot LLC, a startup at UC Merced, California.

According to some embodiments of the invention, the adjusting device and/or mobile robots may also provide local sensing of moisture, chemical, thermal status using ground probes or a variety of other sensing modalities and relay results to a distributed or central computer system. The system can be implemented by modifying commercially-available wireless networks and agriculture robots.

Stressed plants (or over-watered plants) are easy to detect visually because of their color, shape, and biomass. Hence, a basic solution is to train a classifier and solve the identification problem with a normal camera taking pictures of the plants as the robot moves in the orchard. Alternatively, other sensors like the CropSpec by TopCon http://ag.topconpositioning.com/ag-products/x20-application-kits/cropspec, may be used to estimate biomass in plants. One or more of the above-described sensing systems may be used to collect irrigation data that is used by the adjustment device for adjusting a passive drip irrigation valve to enable precision irrigation.

The valves are designed to be easily operated by an adjusting device to facilitate periodic adjustment of water flow based on sensor data collected by satellites, aerial vehicles or ground based sensors, thereby providing more fine-grained control of water flow to compensate for variations in plant physiology, ground elevation, soil composition, drainage, hose diameter due to dirt, damage from insects, rodents, other animals and factors that vary across the planting region.

Software may be embedded in the data storage system of the hand-held or robot-held adjusting device for processing the data to identify the area from the sensor data that requires water. In essence the software could integrate components such as 1—Autonomous navigation in the orchard with accurate localization. This level of competence is currently being developed by FrootBot, LLC, currently targeting a different problem requiring autonomous navigation in the orchard.

2—Taking of local and ground probing sensor readings using vision, thermal, chemical, or other means.

3—Classification of the status of each plant, based on computer vision and/or other sensor.

4—Optimization of valve settings based on network flow models.

5—Adjustment of the valve when sensor data suggest an adjustment is needed (including path planning for the arm, grasp planning if needed, etc).

Figure 17:
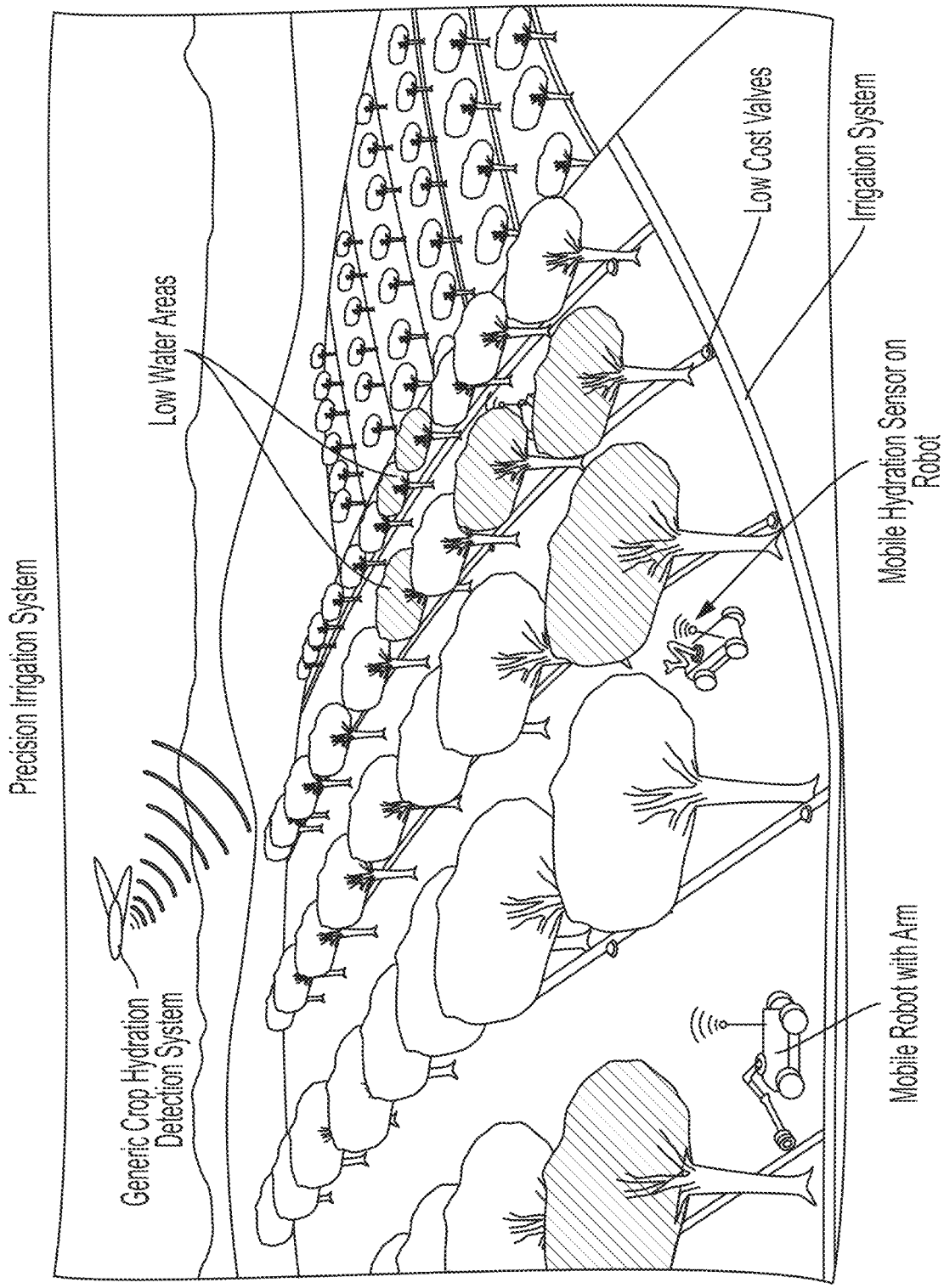
FIG. 17 shows a precision irrigation system including mobile robots that move through the agricultural area to perform hydration sensing and valve adjustments.

Laser range finders are part of the standard payload of numerous robots, including the Husky. Devices like the Sick LMS 100 provide accurate distance measurements. When combined with images produced by an off-the-shelf camera onboard the robot, an accurate estimation of the distance between the robot and the valve may be obtained. https://en.wikipedia.org/wiki/Machine_vision FIG. 17 shows a precision irrigation system according to some embodiments of the invention. The valves are shown as dots at each plant within an orchard's irrigation system. There are several robots interacting with the valves and moving towards areas of low hydration. The external sensor is shown as a UAV for supplying environmental and visual data. However, the UAV could be replaced by a network of cameras, dispersed hydration sensors, satellites, or other sensing modalities such as distributed ground based robots.

The following examples describe some embodiments in more detail. The broad concepts of the current invention are not intended to be limited to the particular examples. Further, concepts from each example are not limited to that example, but may be combined with other embodiments of the system.

EXAMPLES

We present the design of a handheld Device for Automated Tuning of Emitters (DATE) for actuation of a precision irrigation system. We present a novel design for a two-stage mechanical gripper that automatically aligns to and adjusts individual emitter output. We prototype the DATE as a handheld device (illustrated in FIG. 18) which can guide workers (robotic or human) through a field to locate the next emitter (also shown in FIG. 18) to be adjusted. We also provide experimental evaluation of the DATE's ability to dock and adjust emitters under position and orientation uncertainty.

An unmanned ground vehicle (UVG) with the DATE mounted on a robotic arm will travel through an outdoor agricultural environment with large variability in textures and scenic clutter. Recent work [33] proposed heuristics to grasp unknown or unrecognized objects based on both the overall shape of the object and local features obtained from RGB-D sensor data. Active exploration using an eye-in-hand range sensor has been used for 3D scene reconstruction [36] and object detection in cluttered environments [9]. Active exploration for robotic grasping has been explored in prior work [19]. Methods for grasping unknown objects [7] use active exploration to reconstruct the 3D geometry of the object before planning a grasp.

Research on caging grasps, where an object's mobility is constrained to not move arbitrarily far away from the manipulator instead of immobilizing the object completely, has recently shown promise for manipulation tasks, since caging grasps allow increased flexibility compared to classical force closure grasps [24]. The connection between caging and grasping has also been investigated in [31], which showed that increasingly tight cages can result in force closure grasps. The closing mechanism of our design also incorporates aspects of this philosophy, since the drip valve is being increasingly constrained as our mechanism closes.

System Design

The DATE is designed with the following constraints: 1) Positive engagement between the fine actuator (gripper) and the emitter, 2) Modularity for mounting to a human-interface grip or robotic arm, 3) Ability to overcome positional uncertainty between the DATE and the emitter, 4) Individual emitter locating within a field of thousands spaced 1 m, and 5) Remote base station communication to update control parameters.

Emitter Design

Figure 19A:
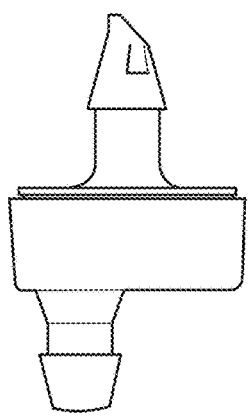
FIG. 19A shows a conventional fixed-flow emitter having a 0.75 inch diameter.
Figure 19B:
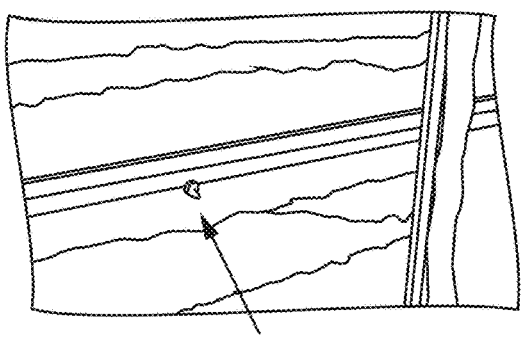
FIG. 19B shows the emitter in a 1 inch diameter drip irrigation line.

The emitter is the distributed, passive component in the precision irrigation network. FIG. 19A shows a conventional fixed-flow emitter having a 0.75 inch diameter. FIG. 19B shows the emitter in a 1 inch diameter drip irrigation line.

Figure 19C:
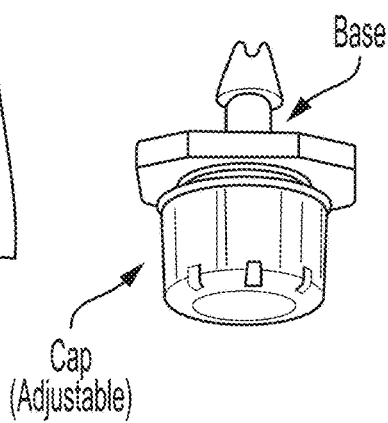
FIG. 19C shows an adjustable flow emitter with a 0.5 inch diameter and an adjustable cap.

FIG. 19C shows an adjustable flow emitter with a 0.5 inch diameter and an adjustable cap. With thousands of units in the field, each emitter must be inexpensive (less than $0.30) for precision irrigation to be viable. The adjustable emitter design presented herein has an adjustable cap that can be rotated by an adjusting device.

Figure 18:
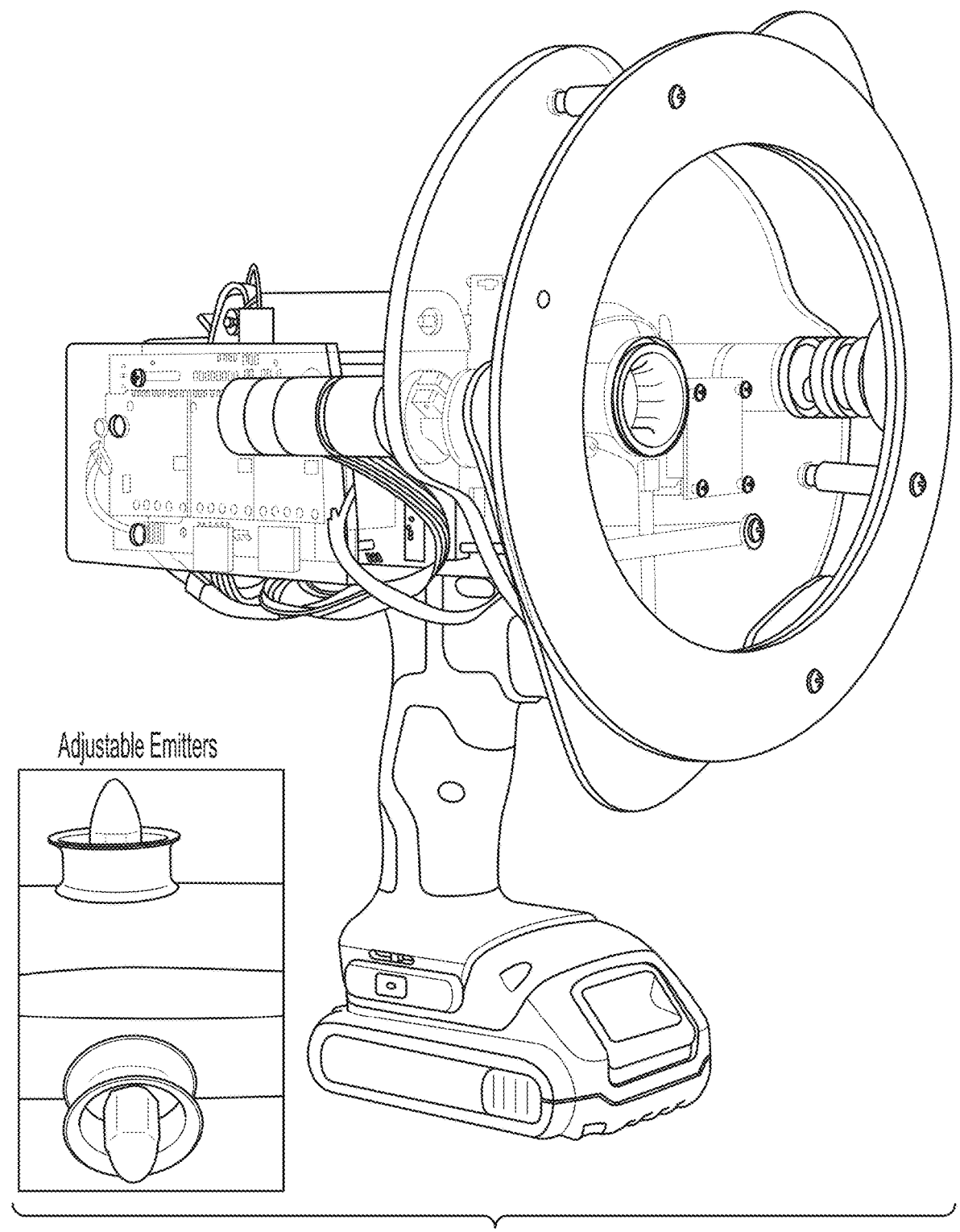
FIG. 18 shows an adjustment device and corresponding passive drip irrigation valve according to some embodiments of the invention.

As shown in FIG. 10, a 45 mm collar feature has been added to the base of the emitter to engage with the coarse mechanical manipulators (shown in FIGS. 12A, 12B) and allow for caging of the emitter. The cap of the emitter has been designed to include features to allow for adjustment of water flow (0-10 gallons per hour) through rotation of the cap with respect to the base of the emitter. Hex indexing features are built into both the cap and the coarse alignment adjustment assembly for engagement by the fine manipulator as seen in FIG. 18.

Date Design

The coarse alignment adjustment assembly of the DATE consists of two mechanical manipulation stages designed to positively engage an adjustable emitter while passively overcoming positional uncertainty. The DATE also includes a 1300 mAh lithium-ion battery and sensors and electronics used to both communicate with a base station and guide the user through the field.

Coarse Alignment Adjustment Assembly: The first manipulation stage orients the DATE with respect to the emitter base. The coarse alignment adjustment assembly uses two rotating arms (shown in FIGS. 12A, 12B) each powered by Actobotics Planetary Gear Motors (638288) with optical encoders to center the emitter within the capture region of the DATE. The rotating arms act as a mechanical iris to draw the center axis of the DATE in-line with the center axis of the emitter.

Figure 20:
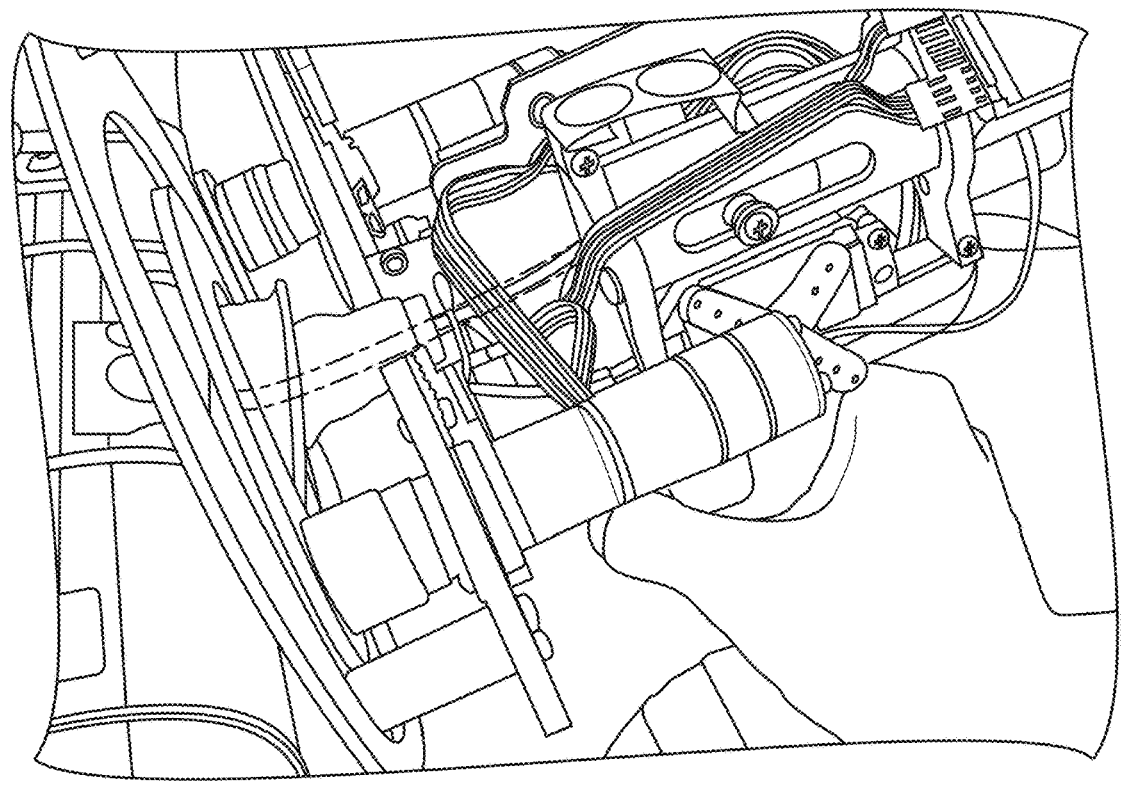
FIG. 20 depicts how the fine mechanical manipulator is designed to funnel the cap of the emitter into engagement.

Fine Actuator: With the emitter centered the second stage fine actuator is inserted to interface with the emitter cap. The fine mechanical manipulator is designed to funnel the cap of the emitter into engagement, as shown in FIG. 20. The fine actuator is inserted by a servo (Futaba S3003). Torque is applied to the cap of the emitter using a Faulhaber 2342S012CR with optical encoders.

Sensors and Electronics

An Arduino Mega (2560) 16 MHz microprocessor controls the motors and sensors. Cloud connectivity is provided by a SIM808 GSM/GPRS+GPS Module. Position within the field is measured using a Mediatek MT3337 22 channel GPS, accurate to 2.5 m. Communication to existing wireless sensor networks [18] is accomplished with an XBee series 2, 2 mW wire antenna, ZigBee protocol radio (XB24-Z7WIT-004) with 5000 ft line-of-sight communication range by Digi. An ID-12LA Radio Frequency IDentification (RFID) module by Innovations is used for short (<5 cm range) emitter identification. When combined with the fact that a user will likely adjust patches of emitters, the short range RFID confirmation eliminates mismatch errors which can arise from false initial guesses between targeted and actual emitters grasped due to the lower resolution of GPS.

The RFID confirmation eliminates errors which could arise from lower resolution GPS. A LSM9DSO 9 Degree of Freedom (DOF) Inertial Measurement Unit (IMU) by ST Micro is used to determine the compass heading of the worker in the field for navigation between actuation points. An 8 GB SD card is used for internal storage of database parameters and to store accumulated WSN data between uplinks to the base station. Power is supplied by a 20 V 1300 mAh lithium-ion battery.

The embodiments of the invention are not limited to the specific components described herein. The specific components are provided as non-limiting examples according to some embodiments of the invention, and other components may be used.

Evaluation

Figure 21:
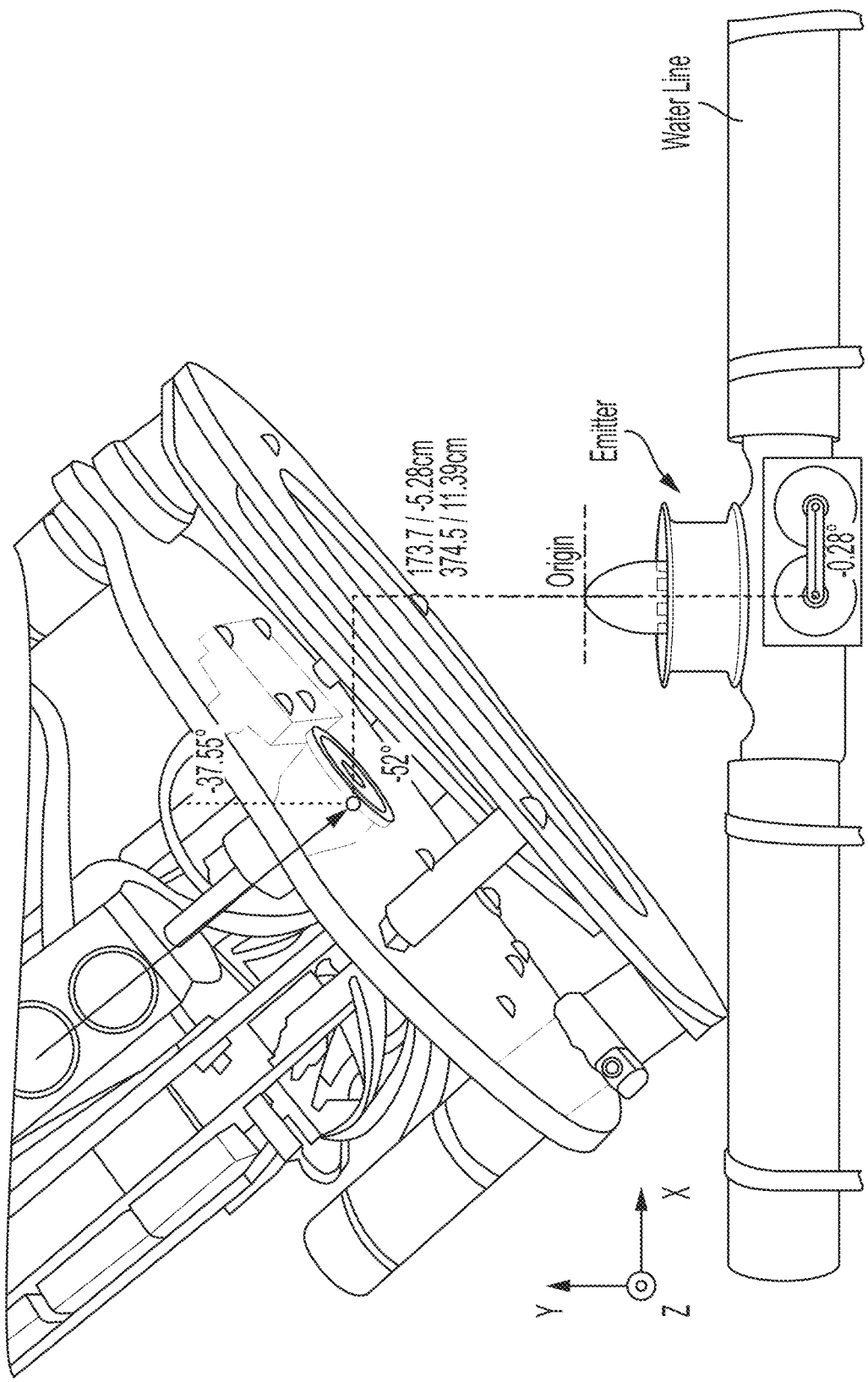
FIG. 21 demonstrates the evaluation of capture success as a function of angular and lateral uncertainty.

An adjustable emitter was mounted to a section of irrigation line below a camera, as shown in FIG. 21. Lateral and angular offsets of the DATE were measured with respect to the tip of the emitter using template matching. This positional data was collected each time the trigger on the DATE was pulled, stored as an approach vector, and manually annotated with the success or failure of the DATE to deliver torque to the emitter cap. Lateral and angular offsets are handled separately by the coarse and fine actuation stages and thus separate data was collected for each stage.

Specifically we evaluate: 1) Coarse mechanical gripping to overcome lateral offsets, 2) fine mechanical gripping to overcome angular offsets, and 3) the resulting capture region.

Figure 22:
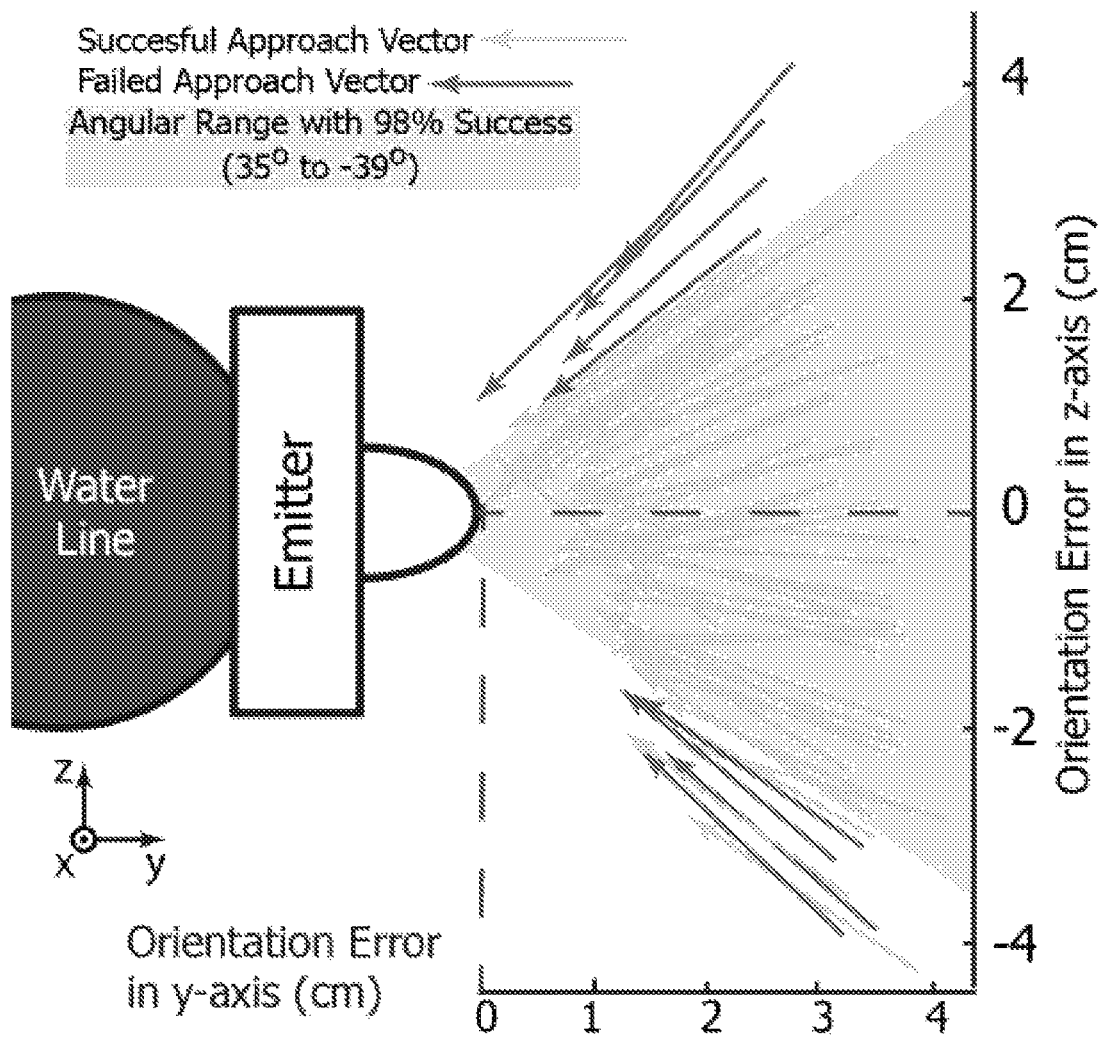
FIG. 22 shows the angular orientation of the adjusting device with respect to the emitter for successful and failed capture attempts.

Angular Uncertainty: The extent of the angular capture region of the DATE was investigated using a side-mounted camera and a similar vision-based tracking system as described above. During this experiment, the DATE was constrained within the z-y plane (as described in FIG. 21) and allowed to rotate freely about the x-axis. Success was measured as a positive rotational lock with the emitter cap. FIG. 22 shows all 60 grasp trials. Grasping success quickly deteriorated above 39 degrees and below −35 degrees from horizontal (defined as the x-y plane as seen in FIG. 21). The DATE had 98% success in grasping within this 74 degree area.

Figure 23:
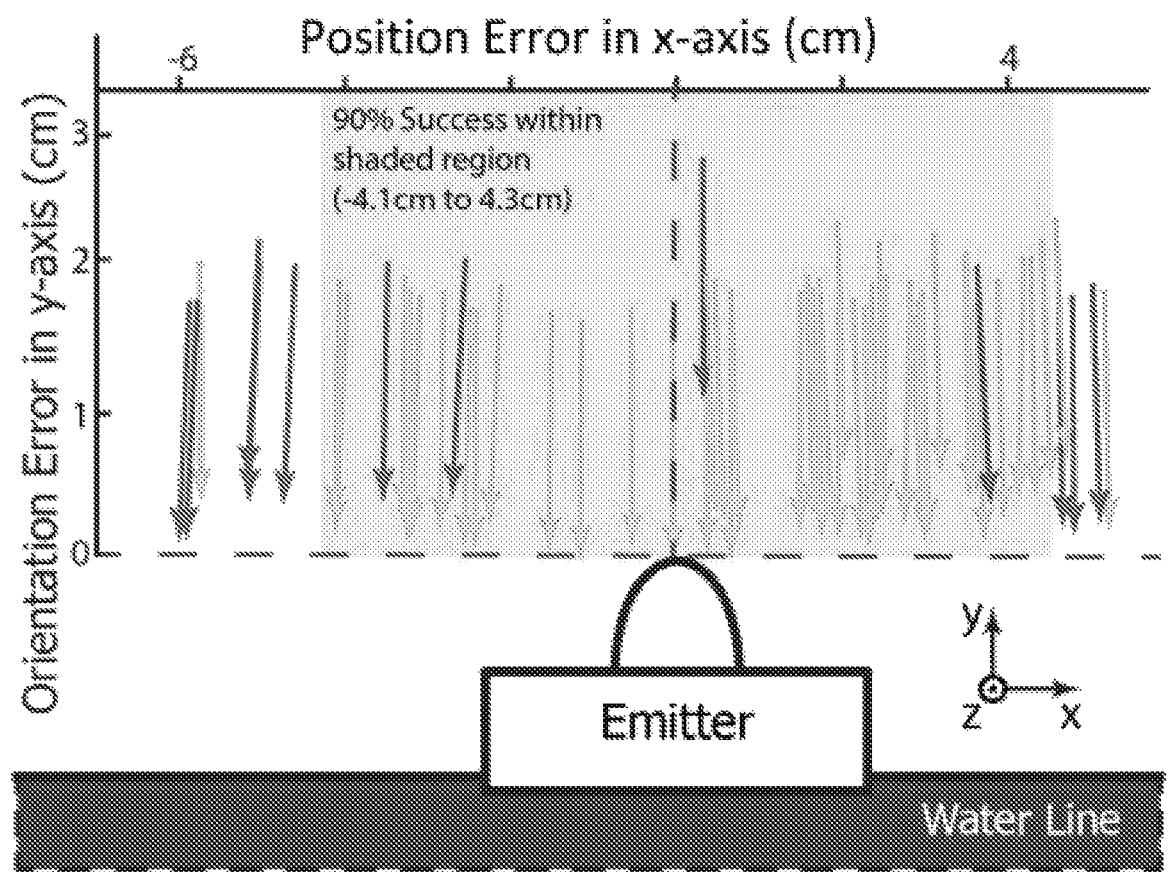
FIG. 23 shows the lateral position of the adjusting device with respect to the emitter for successful and failed capture attempts.

Lateral Uncertainty: The DATE was interfaced with an emitter in 60 trials of lateral position uncertainty (along the x-axis as described in FIG. 21). During this experiment, the DATE was placed over the emitter with a consistent angle of approach about the z-axis. Position was limited to the area within the entrance ring of the DATE (shown in FIG. 3). Success was measured as a positive rotational lock with the emitter cap. There was a 90% success rate within the region −4.1 cm and 4.3 cm from the emitter origin. Some failures were caused by insufficient insertion of the emitter base into the coarse mechanical manipulators of the DATE. FIG. 23 describes the lateral extent of the DATE capture region. The DATE had 90% success in grasping the 45 mm diameter emitter base over a window of 8.4 cm (−4.1 cm to 4.3 cm from origin).

A robotic- or human-centered coarse alignment adjustment assembly is described herein for interfacing with adjustable drip irrigation emitters distributed in an agricultural operation. Also considered are the sensors and actuators requisite to enable a roving worker to automatically interface and adjust individual emitters as directed by a cloud-based control algorithm. The 60 grasping trials illustrated in FIG. 23 were constrained to be orthogonal to the water line because the flat face plate of the DATE seen in FIG. 21 collided before the emitter collar could reach the coarse manipulators. To address this angle of uncertainty, the DATE can be designed with a compliant faceplate.

According to some embodiments, a human operator coarsely positions the system. After minimizing the overall size of the DATE, the coarse alignment adjustment assembly design presented here can also be mounted to the end of a UGV arm, e.g. the Jackal UGV by Clearpath Robotics, which can be interfaced with a 6DOF Kinova MICO arm. The UGV using the DATE to adjust valves could relax its accuracy constraints to be within 4 cm laterally and 35 degrees of rotational misalignment.

Figure 24:
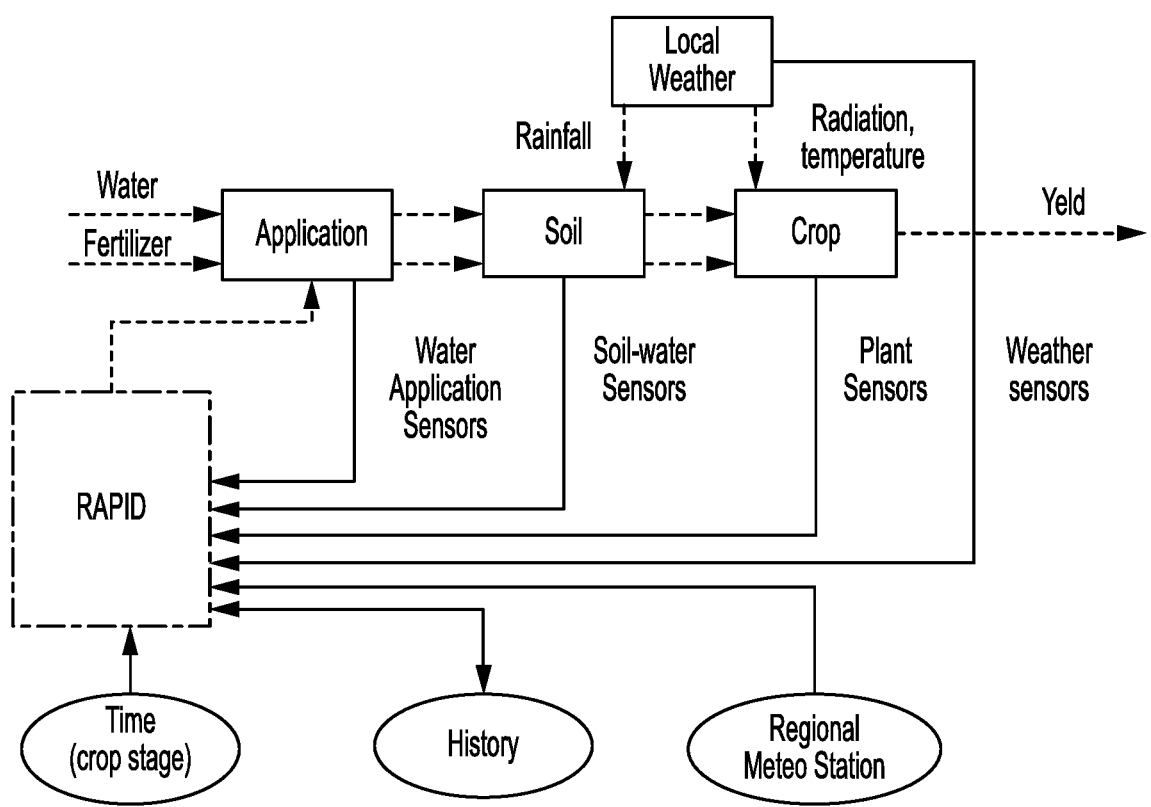
FIG. 24 illustrates how agricultural fields can be reimagined as control systems to maximize crop yield.

FIG. 24 illustrates how agricultural fields can be reimagined as control systems to maximize crop yield. Robot-assisted precision irrigation deliver (RAPID) closes the gap between sensing and actuation.

REFERENCES

[1] Tilney, M.; Leclerc, R.; Dernarest, E., "AgTech Investing Report: Year In Review 2014," *AgFunder,* 2015.
[2] BIS Research, "Global Precision Agriculture Market Analysis & Forecast (2015-2022) Technology (VRA, Soil Mapping, Yield Monitoring, Precision Irrigation, Others), Components and Systems," *Research and Markets,* 2014.
[3] http://www.bloomberg.com/news/articles/2014-07-24/california-water-pries-soar-for-farmers-as-drought-grows
[4] Bouet, Mathieu, and Aldri L. Dos Santos. "RFID tags: Positioning principles and localization techniques." 2008 1st IFIP Wireless Days. IEEE, 2008.
[5] "CIMIS—california irrigation management information system," http://www.cimis.water.ca.gov/, [Online; accessed February 2016].
[6] "Hydrus 2D/3D" http://www.pc-progress.com/en/Default.aspx?hydrus3d, [Online; accessed February 2016].
[7] J. Aleotti, D. Lodi Rizzini, and S. Caselli, "Perception and Grasping of Object Parts from Active Robot Exploration," Journal of Intelligent & Robotic Systems, pp. 1-25, 2014.
[8] J. Arno, J. Martnez-Casasnovas, M. Ribes-Dasi, and J. Rosell, "Review. precision viticulture. research topics, challenges and opportunities in site-specific vineyard management," Spanish Journal of Agricultural Research, vol. 7, no. 4, pp. 779-790, 2009.
[9] N. Atanasov, B. Sankaran, J. Le Ny, T. Koletschka, G. Pappas, and K. Daniilidis, "Hypothesis Testing Framework for Active Object Detection," in Proceedings of the IEEE International Conference on Robotics and Automation, 2013, pp. 4216-4222.
[10] F. A. Auat Cheein and R. Carelli, "Agricultural robotics: Unmanned robotic service units in agricultural tasks," Industrial Electronics Magazine, IEEE, vol. 7, no. 3, pp. 48-58, 2013.
[11] T. Bak and H. Jakobsen, "Agricultural robotic platform with four wheel steering for weed detection," Biosystems Engineering, vol. 87, no. 2, pp. 125-136, 2004.
[12] J. Bellvert, P. Zarco-Tejada, J. Girona, and E. Fereres, "Mapping crop water stress index in a pinot-noirvineyard: comparing ground measurements with thermal remote sensing imagery from an unmanned aerial vehicle," Precision agriculture, vol. 15, no. 4, pp. 361-376, 2014.
[13] R. W. Coates, M. J. Delwiche, A. Broad, and M. Holler, "Wireless sensor network with irrigation valve control," Computers and electronics in agriculture, vol. 96, pp. 13-22, 2013.
[14] L. Emmi, M. Gonzalez-de Soto, G. Pajares, and P. Gonzalez-de Santos, "New trends in robotics for agriculture: integration and assessment of a real fleet of robots," The Scientific World Journal, vol. 2014, 2014.
[15] P. H. Gleick, "Water use," Annual Review of Environment and Resources, vol. 28, no. 1, pp. 275-314, 2003.
[16] J. Gutierrez, J. F. Villa-Medina, A. Nieto-Garibay, and M. A. Porta-Gandara, "Automated irrigation system using a wireless sensor network and gprs module," Instrumentation and Measurement, IEEE Transactions on, vol. 63, no. 1, pp. 166-176, 2014.
[17] B. Hansona, L. Schwankl, K. Schulbach, and G. Pettygrove", "A comparison of furrow, surface drip, and subsurface drip irrigation on lettuce yield and applied water," Agricultural Water Management, vol. 33, 1997.
[18] T. Hinterhofer and S. Tomic, "Wireless qos-enabled multi-technology communication for the rhea robotic fleet," RHEA-2011 Robotics and Associated High-Technologies and Equipment for Agriculture, 2011.
[19] D. Holz, M. Nieuwenhuisen, D. Droeschel, J. Stuckler, A. Berner, J. Li, R. Klein, and S. Behnke, "Active Recognition and Manipulation for Mobile Robot Bin Picking," in Gearing up and Accelerating Cross-fertilization between Academic and Industrial Robotics Research in Europe, 2014, pp. 133-153.

[20] R. Howitt, J. Medellin-Azuara, D. MacEwan, J. Lund, and D. Sumner, "Economic analysis of the 2014 drought for california agriculture," Center for Watershed Sciences, University of California, Davis, 2014.

[21] D. A. Johnson, D. J. Naffin, J. S. Puhalla, J. Sanchez, and C. K. Wellington, "Development and implementation of a team of robotic tractors for autonomous peat moss harvesting," Journal of Field Robotics, vol. 26, no. 6-7, pp. 549-571, 2009.

[22] M. M. Kandelous and J. Simunek, "Comparison of numerical, analytical, and empirical models to estimate wetting patterns for surface and subsurface drip irrigation," Irrigation Science, vol. 28, no. 5, pp. 435-444, 2010.

[23] S. Lopus, M. Santibanez, R. Beede, R. Duncan, J. Edstrom, F. Niederholzer, C. Tredler, and P. Brown, "Survey examines the adoption of perceived best management practices for almond nutrition," California Agriculture, vol. 64, no. 3, pp. 149-154, 2010.

[24] J. Mahler, F. T. Pokorny, Z. McCarthy, A. F. van der Stappen, and K. Goldberg, "Energy-bounded caging: Formal definition and 2-d energy lower bound algorithm based on weighted alpha shapes," IEEE Robotics and Automation Letters, vol. 1, no. 1, pp. 508-515, 2016.

[25] N. Maisiri, A. Senzanje, J. Rockstrom, and S. Twomlow, "On farm evaluation of the effect of low cost drip irrigation on water and crop productivity compared to conventional surface irrigation system," Physics and Chemistry of the Earth, Parts A/B/C, 2005.

[26] B. Majone, F. Viani, E. Filippi, A. Bellin, A. Massa, G. Toller, F. Robol, and M. Salucci, "Wireless sensor network deployment for monitoring soil moisture dynamics at the field scale," Procedia Environmental Sciences, vol. 19, pp. 426-435, 2013, four Decades of Progress in Monitoring and Modeling of Processes in the Soil-Plant-Atmosphere System: Applications and Challenges.

[27] H. Navarro-Hell´.n, R. Torres-S'anchez, F. Soto-Valles, C. Albaladejo-Perez, J. Lopez-Riquelme, and R. Domingo-Miguel, "A wireless sensors architecture for efficient irrigation water management," Agricultural Water Management, vol. 151, pp. 64-74, 2015.

[28] Y. Osakabe, K. Osakabe, K. Shinozaki, and L.-S. P. Tran, "Response of plants to water stress," Front. Plant Sci, vol. 5, no. 86, pp. 10-3389, 2014.

[29] G. Provenzano, "Using hydrus-2d simulation model to evaluate wetted soil volume in subsurface drip irrigation systems," Journal of Irrigation and Drainage Engineering, vol. 133, no. 4, pp. 342-349, 2007.

[30] D. Robinson, C. Campbell, J. Hopmans, B. Hornbuckle, S. Jones, R. Knight, F. Ogden, J. Selker, and O. Wendroth, "Soil moisture measurement for ecological and hydrological watershed-scale observatories: A review," Vadose Zone Journal, 2008.

[31] A. Rodriguez, M. T. Mason, and S. Ferry, "From caging to grasping," The International Journal of Robotics Research, 2012.

[32] N. Romano, "Soil moisture at local scale: Measurements and simulations," Journal of Hydrology, vol. 516, pp. 6-20, 2014.

[33] A. Saxena, J. Driemeyer, and A. Ng, "Robotic Grasping of Novel Objects using Vision," International Journal of Robotics Research, vol. 27, no. 2, pp. 157-173, 2008.

[34] S. A. Shumake, R. T. Sterner, and S. E. Gaddis, "Repellents to reduce cable gnawing by northern pocket gophers," The Journal of wildlife management, pp. 1344-1349, 1999.

[35] L. Tian, "Development of a sensor-based precision herbicide application system," Computers and electronics in agriculture, vol. 36, no. 2, pp. 133-149, 2002.

[36] L. Torabi and K. Gupta, "An Autonomous Six-DOF Eye-in-hand System for In Situ 3D Object Modeling," International Journal of Robotics Research, vol. 31, no. 1, pp. 82-100, 2012.

[37] A. ur Rehman, A. Z. Abbasi, N. Islam, and Z. A. Shaikh, "A review of wireless sensors and networks' applications in agriculture," Computer Standards & Interfaces, vol. 36, no. 2, pp. 263-270, 2014.

[38] H. Vereecken, J. Huisman, Y. Pachepsky, C. Montzka, J. van der Kruk, H. Bogena, L. Weiherm uller, M. Herbst, G. Martinez, and J. Vanderborght, "On the spatio-temporal dynamics of soil moisture at the field scale," Journal of Hydrology, vol. 516, pp. 76-96, 2014.

[39] C. J. V "or" osmarty, P. Green, J. Salisbury, and R. B. Lammers, "Global water resources: vulnerability from climate change and population growth," science, vol. 289, no. 5477, pp. 284-288, 2000.

[40] S. G. Vougioukas, "A distributed control framework for motion coordination of teams of autonomous agricultural vehicles," Biosystems engineering, vol. 113, no. 3, pp. 284-297, 2012.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. An adjusting device for adjusting a passive drip irrigation valve to enable precision irrigation, comprising:
   a device body configured to be at least one of hand-held or attachable to a robot, said device body having a manipulator end; and
   a manipulator assembly contained within and extending from said manipulator end of said device body,
   wherein said manipulator assembly comprises a coarse alignment adjustment assembly constructed and arranged to align said adjusting device with the passive drip irrigation valve, and
   wherein said manipulator assembly further comprises a fine actuator configured to rotate the passive drip irrigation valve by a specified angle.

2. The adjusting device according to claim 1, further comprising:
   a navigation system disposed on or within said device body, said navigation system having an accuracy sufficient to guide the adjusting device to a particular passive drip irrigation valve.

3. The adjusting device according to claim 2, further comprising:
   a display system at least one of attached to or integral with said device body so as to communicate with a human user holding said adjusting device, wherein the display system uses at least one of a visual display and audio signals to communicate.

4. The adjusting device according to claim 3, wherein the navigation system is configured to provide navigation information to the display system, and
wherein the display system is configured to display the navigation information to enable a human user to locate the passive drip irrigation valve.

5. The adjusting device according to claim 3, further comprising a wireless receiver disposed within said device body and configured to communicate with an external wireless communication system,
wherein said wireless receiver is further in communication with the display system,
wherein the display system is configured to display information received via the external wireless communication system.

6. The adjusting device according to claim 5, further comprising a data storage system in communication with the wireless receiver, wherein the data storage system receives updated information via the wireless receiver, wherein the updated information is one of an amount to adjust the passive drip irrigation valve, and a navigational waypoint for locating the passive drip irrigation valve.

7. The adjusting device according to claim 3, wherein the navigation system comprises an inertial measurement system,
wherein the display system is configured to display information received from the inertial measurement system to assist a user in locating the passive drip irrigation valve.

8. The adjusting device according to claim 3, further comprising:
an environmental conditions sensor disposed on or within said device body, wherein said environmental conditions sensor collects data regarding an area surrounding the passive drip irrigation valve, and provides the data to the display system,
wherein the display system determines an amount to rotate the passive drip irrigation valve based on the data.

9. The adjusting device according to claim 8, wherein the environmental conditions sensor is one of a visual camera or an infrared camera.

10. The adjusting device according to claim 8, wherein the environmental conditions sensor is a soil probe.

11. The adjusting device according to claim 8, wherein the adjusting device further comprises at least one of a data storage system configured to store data collected by the environmental conditions sensor, and a wireless transmitter configured to transmit data collected by the environmental conditions sensor.

12. The adjusting device according to claim 2, wherein the adjusting device is configured to be operated by a mobile robot.

13. The adjusting device according to claim 12, wherein the navigation system is configured to guide the mobile robot to the passive drip irrigation valve.

14. The adjusting device according to claim 1, further comprising a radio frequency identification (RFID) system disposed within said device body, said RFID system being configured to read an RFID tag fixed at a position proximate the passive drip irrigation valve.

15. The adjusting device according to claim 14, further comprising a data storage system configured to:

receive an RFID signal corresponding to the RFID tag fixed at the position proximate the passive drip irrigation valve, and
retrieve information from the data storage system regarding the specified angle to adjust the passive drip irrigation valve.

16. The adjusting device according to claim 15, wherein the adjusting device stores data regarding which passive drip irrigation valves of a plurality of passive drip irrigation valves have been adjusted.

17. A system for enabling precision irrigation, comprising:
an adjusting device for adjusting a passive drip irrigation valve, comprising:
a device body configured to be at least one of hand-held or attachable to a robot, said device body having a manipulator end; and
a manipulator assembly contained within and extending from said manipulator end of said device body; and
a processor configured to process irrigation data and communicate with the adjusting device about desired changes to the passive drip irrigation valve based on the processed irrigation data,
wherein said manipulator assembly comprises a coarse alignment adjustment assembly constructed and arranged to align said adjusting device with the passive drip irrigation valve, and
wherein said manipulator assembly further comprises a fine actuator configured to rotate the passive drip irrigation valve by a specified angle.

18. A system for enabling precision irrigation according to claim 17, wherein the processor is configured to receive the irrigation data from a database.

19. A system for enabling precision irrigation according to claim 17, further comprising:
an irrigation measurement system in communication with the processor, wherein the processor is configured to receive the irrigation data from the irrigation measurement system.

20. A system for enabling precision irrigation according to claim 19, wherein the irrigation measurement system comprises a network of sensors distributed in an agricultural setting.

21. A system for enabling precision irrigation according to claim 19, wherein the irrigation measurement system comprises a remote sensing system configured to provide image data,
wherein the processor is configured to process the image data to obtain the irrigation data.

22. A system for enabling precision irrigation according to claim 17, further comprising a precision irrigation system.

23. A system for enabling precision irrigation according to claim 22, wherein said precision irrigation system comprises a network of irrigation pipes in fluid connection with a plurality of passive drip irrigation valves.

24. A robotic system for precision irrigation, comprising:
a mobile robot comprising a robot arm, said robot arm comprising an actuator configured to connect to and manipulate a passive drip irrigation valve to be adjusted;
a control system in communication with the mobile robot; and
a navigation system in communication with the control system, said navigation system having an accuracy sufficient to guide the mobile robot to a particular passive drip irrigation valve, wherein the control system is configured to:
identify a location of the passive drip irrigation valve based on information received from the navigation system, and
instruct the mobile robot to connect to and manipulate the passive drip irrigation valve to adjust a rate of fluid flow through the passive drip irrigation valve.

25. A robotic system for precision irrigation according to claim 24, wherein the control system is configured to determine, based on irrigation data, an amount to rotate the passive drip irrigation valve to adjust the rate of fluid flow through the passive drip irrigation valve by a predetermined amount, and instruct the mobile robot to rotate the passive drip irrigation valve by the determined amount.

26. A robotic system for precision irrigation according to claim 24, wherein the control system is configured to determine which route of a plurality of possible routes for moving to and adjusting a plurality of passive drip irrigation valves is most time-efficient, and
instruct said mobile robot to move to and adjust the plurality of passive drip irrigation valves according to the determined route.

* * * * *